United States Patent
Parvan et al.

(10) Patent No.: US 11,374,662 B2
(45) Date of Patent: Jun. 28, 2022

(54) AUTOMATIC RECEIVER CHAIN SUPERVISION

(71) Applicant: Telefonaktiebolaget LM Ericsson (publ), Stockholm (SE)

(72) Inventors: Mihai Parvan, Greely (CA); Georgy Levin, Ottawa (CA); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 173 days.

(21) Appl. No.: 16/096,798

(22) PCT Filed: Apr. 27, 2016

(86) PCT No.: PCT/IB2016/052394
§ 371 (c)(1),
(2) Date: Oct. 26, 2018

(87) PCT Pub. No.: WO2017/187230
PCT Pub. Date: Nov. 2, 2017

(65) Prior Publication Data
US 2019/0305860 A1 Oct. 3, 2019

(51) Int. Cl.
*H04B 17/29* (2015.01)
*H04B 17/23* (2015.01)
(Continued)

(52) U.S. Cl.
CPC ............ *H04B 17/29* (2015.01); *H04B 17/23* (2015.01); *H04B 17/26* (2015.01); *H04B 17/318* (2015.01); *H04B 17/345* (2015.01)

(58) Field of Classification Search
CPC ........ H04B 17/29; H04B 17/23; H04B 17/26; H04B 17/318; H04B 17/345
See application file for complete search history.

(56) References Cited

U.S. PATENT DOCUMENTS 6,542,629 B1 * 4/2003 Wu ..................... H04N 1/00846
356/71
7,151,790 B1 * 12/2006 Patenaude ............ H04B 1/7156
375/132
(Continued)

FOREIGN PATENT DOCUMENTS

| EP | 2226955 A2 | 9/2010 |
| WO | 2009025595 A1 | 2/2009 |
| WO | 2014148965 A1 | 9/2014 |

OTHER PUBLICATIONS

Kanji, Gopal K., "100 Statistical Tests: Third Edition," SAGE Publications, London, 2006, 251 pages.
(Continued)

*Primary Examiner* — Un C Cho
*Assistant Examiner* — Yu-Wen Chang
(74) *Attorney, Agent, or Firm* — Sage Patent Group

(57) ABSTRACT

In some embodiments, a method of operation of a node to monitor for faults in a receiver subsystem of a radio node comprises estimating a noise floor for each receiver chain of a plurality of receiver chains in the receiver subsystem of the radio node for each of one or more carriers to thereby provide a plurality of noise floor estimates. The method further comprises determining average received power for each receiver chain of the plurality of receiver chains in the receiver subsystem of the radio node for each of one or more carriers to thereby provide a plurality of average received power measurements. The method further comprises determining that there is a fault in the receiver subsystem of the radio node based on at least one of (a) a subset of the plurality of noise floor estimates and (b) a subset of the plurality of average received power measurements.

27 Claims, 12 Drawing Sheets

(51) Int. Cl.
*H04B 17/26* (2015.01)
*H04B 17/318* (2015.01)
*H04B 17/345* (2015.01)

(56) References Cited

U.S. PATENT DOCUMENTS

| | | | |
|---|---|---|---|
| 9,450,688 B1* | 9/2016 | Murphy | H04B 17/27 |
| 2003/0212652 A1* | 11/2003 | Gold | G06T 5/20 |
| 2008/0095085 A1* | 4/2008 | Goodjohn | H04W 24/04 |
| | | | 370/310 |
| 2008/0101288 A1* | 5/2008 | Wan | H04W 52/04 |
| | | | 370/329 |
| 2009/0075648 A1* | 3/2009 | Reed | H04L 41/0823 |
| | | | 455/424 |
| 2010/0120415 A1 | 5/2010 | Urquhart et al. | |
| 2010/0214931 A1 | 8/2010 | Wigren | |
| 2011/0009070 A1* | 1/2011 | Wigren | H04B 17/345 |
| | | | 455/67.13 |
| 2011/0021222 A1* | 1/2011 | Wigren | H04B 17/373 |
| | | | 455/501 |
| 2011/0201269 A1* | 8/2011 | Hobbs | H04B 7/15535 |
| | | | 455/9 |
| 2011/0312282 A1* | 12/2011 | Prather | H04B 17/345 |
| | | | 455/67.13 |
| 2012/0290888 A1* | 11/2012 | Harvey | H04B 17/21 |
| | | | 714/E11.177 |
| 2013/0260763 A1* | 10/2013 | Bhattad | H04L 5/14 |
| | | | 455/436 |
| 2014/0153418 A1* | 6/2014 | Hariharan | H04W 24/10 |
| | | | 370/252 |
| 2016/0245921 A1* | 8/2016 | Li | G01S 19/02 |
| 2017/0041813 A1* | 2/2017 | Reed | H04W 4/02 |
| 2017/0064642 A1* | 3/2017 | Tarlazzi | H04W 52/36 |
| 2018/0198520 A1* | 7/2018 | Heath | H04L 41/0645 |

OTHER PUBLICATIONS

Wigren, Torbjörn, et al., "Estimation of uplink WCDMA load in a single RBS," Proceedings of the IEEE 66th Vehicular Technology Conference, Sep. 30-Oct. 3, 2007, Baltimore, USA, pp. 1499-1503.
Wigren, Torbjörn, "Recursive Noise Floor Estimation in WCDMA," IEEE Transactions on Vehicular Technology, vol. 59, No. 5, Jun. 2010, pp. 2615-2620.
Wigren, Torbjöorn, "Soft Uplink Load Estimation in Wcdma," IEEE Transactions on Vehicular Technology, vol. 58, No. 2, Feb. 2009, pp. 760-772.
International Search Report and Written Opinion for International Patent Application No. PCT/IB2016/052394, dated Dec. 22, 2016, 11 pages.

* cited by examiner

AUTOMATIC RECEIVER CHAIN SUPERVISION

This application is a 35 U.S.C. § 371 national phase filing of International Application No. PCT/IB2016/052394, filed Apr. 27, 2016, the disclosure of which is incorporated herein by reference in its entirety.

TECHNICAL FIELD

The present disclosure relates to a multi-antenna, single or multi-carrier receiver and, in particular, to the automatic detection of faults in the multi-antenna, single or multi-carrier receiver.

BACKGROUND

FIG. 1 illustrates a typical receiver (Rx) chain 10 of a radio node in a wireless communication system such as, but not limited to, a Radio Base Station (RBS) in a cellular communications network. As illustrated, the Rx chain 10 includes an antenna 12, optional (i.e., in some implementations) a Tower Mounted Amplifier (TMA) 14, an antenna branch 16, and an Rx digital subsystem 18. The antenna branch 16 includes an Rx analog subsystem 20 and an Analog-to-Digital Converter (ADC) 22. The Rx analog subsystem 20 may include components such as, for example, a filter(s), an amplifier(s) (e.g., a Low Noise Amplifier (LNA)), a mixer(s), etc., as will be appreciated by one of ordinary skill in the art. Further, the details of the Rx analog subsystem 20 will vary depending on the particular implementation. The Rx digital subsystem 10 performs digital processing (e.g., digital filtering, demodulation, etc.). While not illustrated, the Rx chain 10 includes other components such as feeder cables and connectors that interconnect the antenna 12 and the TMA 14 and the Rx analog subsystem 20. The output of the Rx digital subsystem 18 is provided to a Digital Unit (DU) for processing. Note that the Rx chain 10 of FIG. 1 is only an example and may vary depending on the particular implementation.

The gain of the Rx chain 10 from the Antenna Port (AP) (i.e., the port at which the antenna 12 is connected to the Rx analog subsystem 20) to the DU is calibrated in production and has to remain approximately equal to a nominal value during the operation life of the cellular base station. As such, it is desirable to monitor the gain of the Rx chain 10 during operation.

One straightforward method to monitor the gain of the Rx chain 10 is to inject a tone or tones of known power at, e.g., the AP and compare against the output power of a Rx block of interest. However, during the operation, such an approach has a number of disadvantages:

Tone injection requires an additional transmitter and injection couplers at the AP. The latter increases the noise floor, thereby reducing coverage.

Tone injection is prone to create undesired spurious emissions in the Rx band.

During tone injection, the Rx chain may not be operational, i.e. throughput can be reduced.

As such, there is a need for improved systems and methods for monitoring the Rx chain, or more generally monitoring a receiver system of a radio node, to determine whether there is a fault (e.g., a fault that would impact the Rx gain).

SUMMARY

Systems and methods relating to detecting faults in a multi-antenna, single or multi-carrier receiver are disclosed.

In some embodiments, a method of operation of a node to monitor for faults in a receiver subsystem of a radio node comprises estimating a noise floor for each receiver chain of a plurality of receiver chains in the receiver subsystem of the radio node for each of one or more carriers to thereby provide a plurality of noise floor estimates. The method further comprises determining average received signal power for each receiver chain of the plurality of receiver chains in the receiver subsystem of the radio node for each of one or more carriers to thereby provide a plurality of average received signal power measurements. The method further comprises determining that there is a fault in the receiver subsystem of the radio node based on at least one of (a) a subset of the plurality of noise floor estimates and (b) a subset of the plurality of average received signal power measurements. In this manner, a fault in the receiver subsystem can be detected without suffering from drawback associated with conventional techniques such as those that rely on tone injection.

In some embodiments, the method further comprises, upon determining that there is a fault in the receiver subsystem of the radio node, estimating a location of the fault in the receiver subsystem of the radio node.

In some embodiments, determining that there is a fault in the receiver subsystem of the radio node comprises determining that there is a fault in the receiver subsystem of the radio node if at least one of a plurality of fault criteria is met, wherein the plurality of fault criteria comprises: (a) a criterion that at least one of the noise floor estimates in the subset of the plurality of noise floor estimates is outside of a predefined range around a predefined nominal value and (b) a criterion that at least one of the average received signal power measurements in the subset of the plurality of average received signal power measurements is outside of a predefined range around a mean of an average received signal power for a respective one of the one or more carriers across the plurality of receiver chains.

In some embodiments, determining that there is a fault in the receiver subsystem of the radio node comprises determining that there is a fault in the receiver subsystem of the radio node if at least one of the plurality of noise floor estimates is outside of a predefined range around a predefined nominal value. Further, in some embodiments, the method further comprises estimating a location of the fault in the receiver subsystem of the radio node based on at least one of the plurality of noise floor estimates.

In some embodiments, determining that there is a fault in the receiver subsystem of the radio node comprises determining that each of the plurality of noise floor estimates is within a predefined range around a predefined nominal value and, upon determining that each of the plurality of noise floor estimates is within a predefined range around a predefined nominal value, determining that there is a fault in the receiver subsystem of the radio node if, for any carrier of the one or more carriers, at least one of the plurality of average received signal power measurements for the plurality of receiver chains for the carrier is outside of a predefined range around a mean of an average received signal power for the carrier across the plurality of receiver chains.

In some embodiments, the method further comprises determining whether the fault is automatically correctable and automatically correcting the fault upon determining that the fault is automatically correctable. Further, in some embodiments, the method further comprises raising an alert upon determining that the fault is not automatically correctable.

In some embodiments, the method further comprises obtaining Received Total Wideband Power (RTWP) measurements for the plurality of receiver chains for the one or more carriers. Estimating the noise floor for each receiver chain of the plurality of receiver chains in the receiver subsystem of the radio node for each of one or more carriers comprises estimating the noise floor for each receiver chain of the plurality of receiver chains in the receiver subsystem of the radio node for each of one or more carriers based on the RTWP measurements. Determining the average received signal power for each receiver chain of the plurality of receiver chains in the receiver subsystem of the radio node for each of the one or more carriers comprises determining the average received signal power for each receiver chain of the plurality of receiver chains in the receiver subsystem of the radio node for each of the one or more carriers based on the RTWP measurements. Further, in some embodiments, obtaining the RTWP measurements comprises obtaining the RTWP measurements during reception of live traffic within time periods that are likely to be idle. In some embodiments, obtaining the RTWP measurements comprises obtaining the RTWP measurements in a manner in which timing utilized for obtaining the RTWP measurements is synchronized to timing of the one or more carriers such that the RTWP measurements are obtained within time periods that avoid the presence of overhead channel power.

In some embodiments, estimating the noise floor for each receiver chain of the plurality of receiver chains in the receiver subsystem of the radio node for each of one or more carriers based on the RTWP measurements comprises, for each receiver chain of the plurality of receiver chains and each carrier of the one or more carriers, building a histogram of a minimum RTWP measurement for the receiver chain for the carrier over a predefined amount of time and providing a mean of the histogram as the noise floor estimate for the receiver chain for the carrier.

In some embodiments, estimating the noise floor for each receiver chain of the plurality of receiver chains in the receiver subsystem of the radio node for each of one or more carriers based on the RTWP measurements comprises, for each receiver chain of the plurality of receiver chains and each carrier of the one or more carriers, estimating the noise floor for the receiver chain using a hard sliding window noise floor estimation technique in which a minimum RTWP measurement is obtained from $m_1 \times m_2 \ldots \times m_N$ RTWP measurements using N buffers of sizes $m_1, m_2, \ldots, m_N$, respectively.

In some embodiments, estimating the noise floor for each receiver chain of the plurality of receiver chains in the receiver subsystem of the radio node for each of one or more carriers based on the RTWP measurements comprises, for each receiver chain of the plurality of receiver chains and each carrier of the one or more carriers, storing n RTWP measurements for the receiver chain for the carrier in a first buffer of size n, where n is greater than 1. For each receiver chain and each carrier, estimating the noise floor further comprises determining a minimum RTWP measurement from among the n RTWP measurements for the receiver chain for the carrier stored in the first buffer, storing the minimum RTWP measurement in a second buffer of size m, where m is greater than or equal to 2. The steps of storing n RTWP measurements for the receiver chain for the carrier in the first buffer of size n, determining the minimum RTWP measurement from among the n RTWP measurements for the receiver chain for the carrier stored in the first buffer, and storing the minimum RTWP measurement in the second buffer of size m are repeated up to m−1 times. The minimum RTWP measurement in the second buffer is provided as the noise floor estimate for the receiver chain for the carrier.

In some embodiments, the radio node is a radio access node in a cellular communications network.

Embodiments of a node for monitoring for faults in a receiver subsystem of a radio node are also disclosed. In some embodiments, the node comprises a supervision subsystem that monitors for faults in a receiver subsystem of a receiver node, wherein the receiver subsystem comprises a plurality of receiver chains. The supervision subsystem is configured to estimate a noise floor for each receiver chain of the plurality of receiver chains in the receiver subsystem of the radio node for each of one or more carriers to thereby provide a plurality of noise floor estimates. The supervision subsystem is further configured to determine average received signal power for each receiver chain of the plurality of receiver chains in the receiver subsystem of the radio node for each of one or more carriers to thereby provide a plurality of average received signal power measurements. The supervision subsystem is further configured to determine that there is a fault in the receiver subsystem of the radio node based on at least one of (a) a subset of the plurality of noise floor estimates and (b) a subset of the plurality of average received signal power measurements.

In some embodiments, the supervision subsystem is further configured to, upon determining that there is a fault in the receiver subsystem of the radio node, estimate a location of the fault in the receiver subsystem of the radio node.

In some embodiments, for each carrier of the one or more carriers, the node is configured to obtain RTWP measurements for the carrier for the plurality of receiver chains, respectively. Further, the supervision subsystem comprises, for each carrier of the one or more carriers, a plurality of noise floor estimators and a power balance meter. The plurality of noise floor estimators are configured to output noise floor estimates for the plurality of receiver chains for the carrier based on the respective RTWP measurements. The power balance meter is configured to output, based on the RTWP measurements, an indication of which, if any, of the plurality of receiver chains have an average received signal power that is outside of a predefined range around a mean of an average received signal power across the plurality of receiver chains for the carrier. The supervision subsystem further comprises a statistical unit configured to determine that there is a fault in the receiver subsystem of the radio node based on the at least one of (a) the outputs of the plurality of noise floor estimators for the one or more carriers and (b) the outputs of the power balance meters for the one or more carriers. The statistical unit is further configured to, upon determining that there is a fault in the receiver subsystem of the radio node, estimate the location of the fault in the receiver subsystem of the radio node.

In some embodiments, in order to determine that there is a fault in the receiver subsystem of the radio node, the supervision subsystem is further configured to determine that there is a fault in the receiver subsystem of the radio node if at least one of a plurality of fault criteria is met, wherein the plurality of fault criteria comprises: (a) a criterion that at least one of the noise floor estimates in the subset of the plurality of noise floor estimates is outside of a predefined range around a predefined nominal value and (b) a criterion that at least one of average received signal power measurements in the subset of the plurality of average received signal power measurements is outside of a predefined range around a mean of an average received signal power for a respective one of the one or more carriers across the plurality of receiver chains.

In some embodiments, in order to determine that there is a fault in the receiver subsystem of the radio node, the supervision subsystem is further configured to determine that there is a fault in the receiver subsystem of the radio node if at least one of the plurality of noise floor estimates is outside of a predefined range around a predefined nominal value. Further, in some embodiments, the supervision subsystem is further configured to estimate a location of the fault in the receiver subsystem of the radio node based on at least one of the plurality of noise floor estimates.

In some embodiments, in order to determine that there is a fault in the receiver subsystem of the radio node, the supervision subsystem is further configured to determine that each of the plurality of noise floor estimates is within a predefined range around a predefined nominal value and, upon determining that each of the plurality of noise floor estimates is within a predefined range around a predefined nominal value, determine that there is a fault in the receiver subsystem of the radio node if, for any carrier of the one or more carriers, at least one of the plurality of average received signal power measurements for the plurality of receiver chains for the carrier is outside of a predefined range around a mean of an average received signal power for the carrier across the plurality of receiver chains.

In some embodiments, the supervision subsystem is further configured to determine whether the fault is automatically correctable and automatically correct the fault upon determining that the fault is automatically correctable. Further, in some embodiments, the supervision subsystem is further configured to raise an alert upon determining that the fault is not automatically correctable.

In some embodiments, the node is further configured to obtain RTWP measurements for the plurality of receiver chains for the one or more carriers. In order to estimate the noise floor for each receiver chain of the plurality of receiver chains in the receiver subsystem of the radio node for each of one or more carriers, the supervision subsystem is further configured to estimate the noise floor for each receiver chain of the plurality of receiver chains in the receiver subsystem of the radio node for each of one or more carriers based on the RTWP measurements. In order to determine the average received signal power for each receiver chain of the plurality of receiver chains in the receiver subsystem of the radio node for each of the one or more carriers, the supervision subsystem is further configured to determine the average received signal power for each receiver chain of the plurality of receiver chains in the receiver subsystem of the radio node for each of the one or more carriers based on the RTWP measurements. Further, in some embodiments, the RTWP measurements are obtained during reception of live traffic within time periods that are likely to be idle. In some embodiments, the RTWP measurements are obtained in a manner in which timing utilized for obtaining the RTWP measurements is synchronized to timing of the one or more carriers such that the RTWP measurements are obtained within time periods that avoid the presence of overhead channel power.

In some embodiments, in order to estimate the noise floor for each receiver chain of the plurality of receiver chains in the receiver subsystem of the radio node for each of one or more carriers based on the RTWP measurements, the supervision subsystem is further configured to, for each receiver chain of the plurality of receiver chains and each carrier of the one or more carriers, build a histogram of a minimum RTWP measurement for the receiver chain for the carrier over a predefined amount of time and provide a mean of the histogram as the noise floor estimate for the receiver chain for the carrier.

In some embodiments, in order to estimate the noise floor for each receiver chain of the plurality of receiver chains in the receiver subsystem of the radio node for each of one or more carriers based on the RTWP measurements, the supervision subsystem is further configured to, for each receiver chain of the plurality of receiver chains and each carrier of the one or more carriers, estimate the noise floor for the receiver chain using a hard sliding window noise floor estimation technique in which a minimum RTWP measurement is obtained from $m_1 \times m_2 \ldots \times m_N$ RTWP measurements using N buffers of sizes $m_1, m_2, \ldots, m_N$, respectively.

In some embodiments, in order to estimate the noise floor for each receiver chain of the plurality of receiver chains in the receiver subsystem of the radio node for each of one or more carriers based on the RTWP measurements, the supervision subsystem is further configured to, for each receiver chain of the plurality of receiver chains and each carrier of the one or more carriers, store n RTWP measurements for the receiver chain for the carrier in a first buffer of size n, where n is greater than 1. The supervision subsystem is further configured to determine the minimum RTWP measurement from among the n RTWP measurements for the receiver chain for the carrier stored in the first buffer and store the minimum RTWP measurement in a second buffer of size m, where m is greater than or equal to 2. The supervision subsystem is further configured to repeat, up to m−1 times, the steps of storing n RTWP measurements for the receiver chain for the carrier in the first buffer of size n, determining the minimum RTWP measurement from among the n RTWP measurements for the receiver chain for the carrier stored in the first buffer, and storing the minimum RTWP measurement in the second buffer of size m. The supervision subsystem is further configured to provide the minimum RTWP measurement in the second buffer as the noise floor estimate for the receiver chain for the carrier.

In some embodiments, the radio node is a radio access node in a cellular communications network.

In some embodiments, a node for monitoring for faults in a receiver subsystem of a radio node is adapted to estimate a noise floor for each receiver chain of a plurality of receiver chains in the receiver subsystem of the radio node for each of one or more carriers to thereby provide a plurality of noise floor estimates. The node is further adapted to determine average received signal power for each receiver chain of the plurality of receiver chains in the receiver subsystem of the radio node for each of one or more carriers to thereby provide a plurality of average received signal power measurements. The node is further adapted to determine that there is a fault in the receiver subsystem of the radio node based on at least one of (a) the plurality of noise floor estimates and (b) the plurality of average received signal power measurements.

In some embodiments, the node is further adapted to perform the method of any of the embodiments of the node described herein.

In some embodiments, a node for monitoring for faults in a receiver subsystem of a radio node comprises means for estimating a noise floor for each receiver chain of a plurality of receiver chains in the receiver subsystem of the radio node for each of one or more carriers to thereby provide a plurality of noise floor estimates. The node further comprises means for measuring average received signal power for each receiver chain of the plurality of receiver chains in the receiver subsystem of the radio node for each of one or more carriers to thereby provide a plurality of average received signal power measurements. The node further comprises means for determining that there is a fault in the receiver subsystem of the radio node based on at least one of (a) the plurality of noise floor estimates and (b) the plurality of average received signal power measurements.

In some embodiments, a node for monitoring for faults in a receiver subsystem of a radio node comprises an estimation module operable to estimate a noise floor for each receiver chain of a plurality of receiver chains in the receiver subsystem of the radio node for each of one or more carriers to thereby provide a plurality of noise floor estimates. The node further comprises a determining module operable to determine average received signal power for each receiver chain of the plurality of receiver chains in the receiver subsystem of the radio node for each of one or more carriers to thereby provide a plurality of average received signal power measurements. The node further comprises a determining module operable to determine that there is a fault in the receiver subsystem of the radio node based on at least one of (a) the plurality of noise floor estimates and (b) the plurality of average received signal power measurements.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to monitoring for a fault in a multi-antenna, single or multi-carrier receiver (Rx) system of a radio node (e.g., a Radio Base Station (RBS) in a cellular communications network or more generally any radio node in any multi-antenna, single or multi-carrier system) and estimating a location of the fault in the Rx system are disclosed. In some embodiments, the systems and methods further determine whether the fault is automatically correctable and, if so, attempts to automatically correct the fault. Note that, as used herein, "automatically correctable" means correctable, or at least potentially correctable, without user intervention. Likewise, "automatically correct" means to correct, or at least attempt to correct, without user intervention. In general, rather than being based on tone injection which has several associated drawbacks, the systems and methods disclosed herein monitor for a fault in the Rx system of a radio node based on estimating a noise floor at a specific point (e.g., at the output of the Rx digital subsystem) of each of multiple Rx chains in the Rx system. In some embodiments, the noise floor estimation is performed during operation of the radio node by detecting and measuring the power of idle intervals within "live" traffic.

Figure 1:
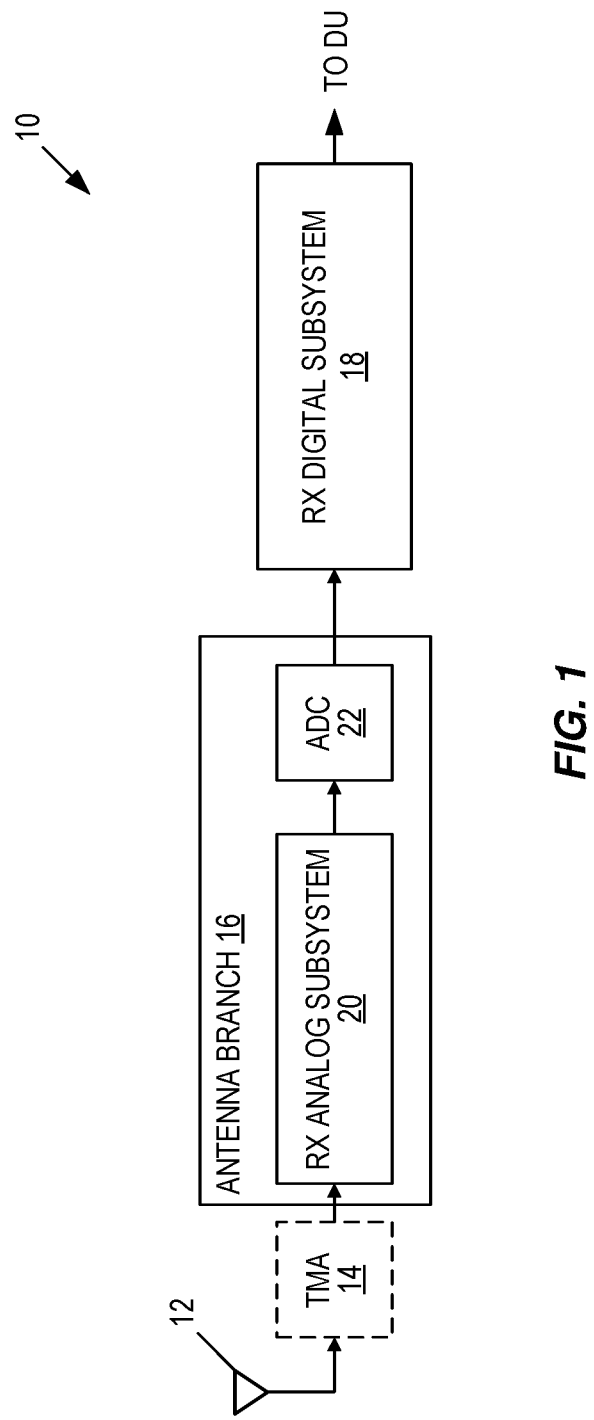
FIG. 1 illustrates a typical receiver (Rx) chain of a Radio Base Station (RBS) for a cellular communications network.
Figure 2:
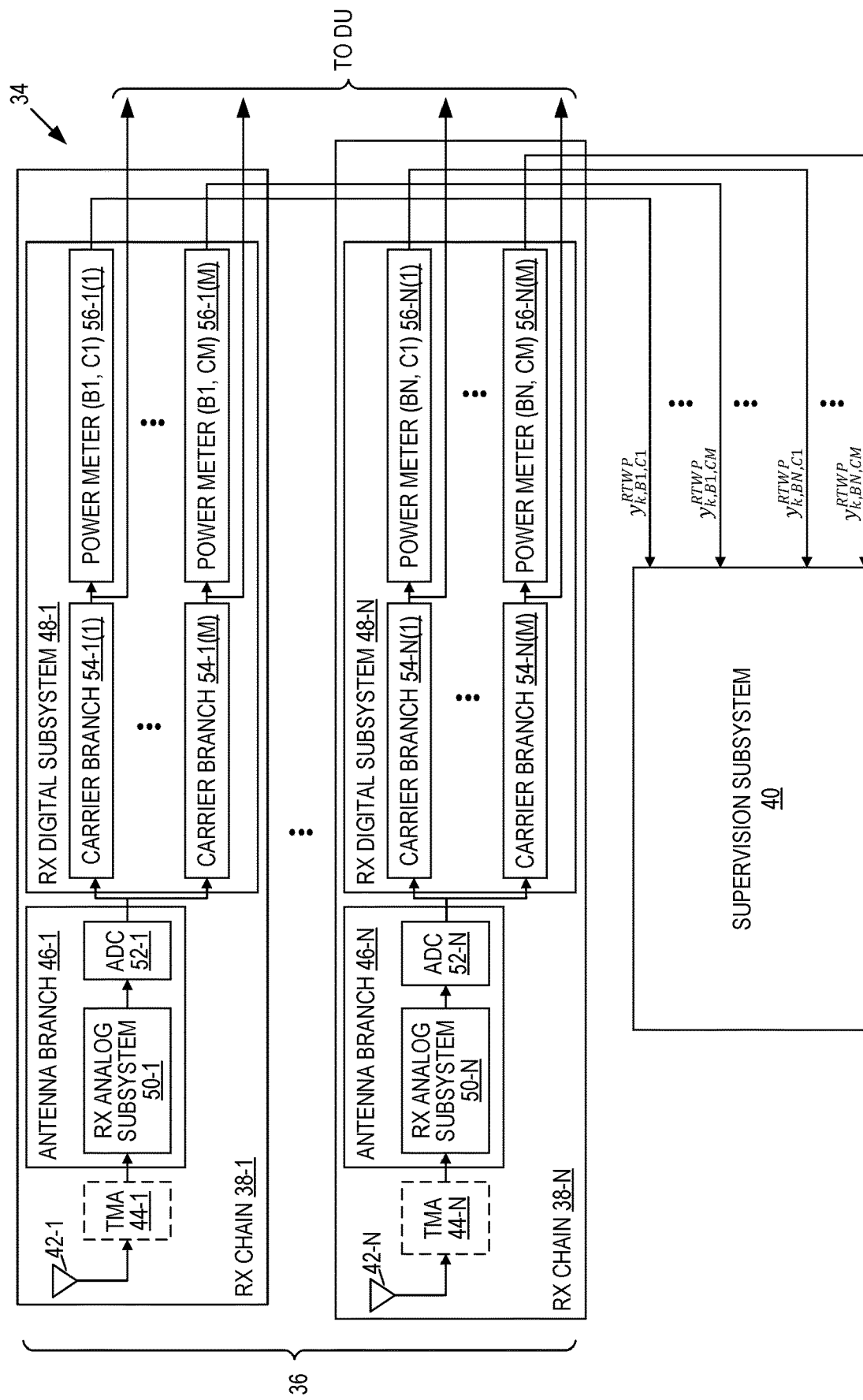
FIG. 2 illustrates a radio node that includes a Rx subsystem that includes multiple Rx chains and a supervision subsystem according to some embodiments of the present disclosure.

In this regard, FIG. 2 illustrates a radio node 34 that includes an Rx subsystem 36 that includes multiple Rx chains 38-1 through 38-N (where N is greater than or equal to 2) and a supervision subsystem 40 according to some embodiments of the present disclosure. As illustrated, the Rx chains 38-1 through 38-N include antennas 42-1 through 42-N, Tower Mounted Amplifiers (TMAs) 44-1 through 44-N (optional), antenna branches 46-1 through 46-N, and Rx digital subsystems 48-1 through 48-N, respectively. The antenna branches 46-1 through 46-N include Rx analog subsystems 50-1 through 50-N and Analog-to-Digital Converters (ADCs) 52-1 through 52-N, respectively. The Rx analog subsystems 50-1 through 50-N include active components (e.g., Low Noise Amplifiers (LNAs)) and passive components (e.g., filters) that operate to amplify, filter, and downconvert signals received via the respective antennas 42-1 through 42-N. Note that the details of the Rx analog subsystems 50-1 through 50-N will vary depending on the particular implementation. The Rx chains 38-1 through 38-N are generally referred to herein collectively as Rx chains 38 and individually as Rx chain 38. The components of the Rx chains 38 are referenced herein in a similar manner (e.g., the antenna branches 46-1 through 46-N are generally referred to herein collectively as antenna branches 46 and individually as antenna branch 46). While not illustrated, the Rx chains 38 include other components such as feeder cables and connectors that interconnect the respective antennas 42, TMAs 44, and the Rx analog subsystems 50.

The outputs of the antenna branches 46-1 through 46-N are provided to the Rx digital subsystems 48-1 through 48-N, respectively. The Rx digital subsystem 48-1 includes multiple carrier branches 54-1(1) through 54-1(M) for M carriers. Each of the carrier branches 54-1(1) through 54-1(M) provides digital processing for a respective one of M carriers. The carrier branches 54-1(1) through 54-1(M) of the Rx digital subsystem 48-1 of the Rx chain 38-1 are generally referred to herein collectively as the carrier branches 54-1 of the Rx chain 38-1 and individually as the carrier branch 54-1 of the Rx chain 38-1. The Rx digital subsystems 48 of the other Rx chains 38 include similar components. For example, the Rx digital subsystem 48-N of the Rx chain 38-N includes multiple carrier branches 54-N(1) through 54-N(M) for M carriers. Each of the carrier branches 54-N(1) through 54-N(M) provides digital processing for a respective one of M carriers. The carrier branches 54-N(1) through 54-N(M) of the Rx digital subsystem 48-N of the Rx chain 38-N are generally referred to herein collectively as the carrier branches 54-N of the Rx chain 38-N and individually as the carrier branch 54-N of the Rx chain 38-N. Even more generally, the carrier branches 54-1(1) through 54-1(M)-54-N(1) through 54-N(M) are generally referred to herein collectively as carrier branches 54 and individually as carrier branch 54. The outputs of the carrier branches 54 are provided to a Digital Unit (DU) for processing.

Still further, in order to enable fault detection, the Rx digital subsystems 48 include power meters 56-1(1) through 56-1(M) for carriers 1 to M, respectively. As an example, the power meter 56-1(1) is referred to herein as a power meter for branch 1 (B1) and carrier 1 (C1), the power meter 56-1(2) is referred to herein as a power meter for branch 2 (B2) and carrier 2 (C2), and so on. In the same manner, the other Rx digital subsystems 48 also include power meters. For example, the Rx digital subsystem 48-N includes power meters 56-N(1) through 56-N(M) for carriers 1 to M, respectively. The power meters 56-1(1) through 54-1(M) of the Rx digital subsystem 48-1 of the Rx chain 38-1 are generally referred to herein collectively as the power meters 56-1 of the Rx chain 38-1 and individually as the power meter 56-1 of the Rx chain 38-1. The power meters 56-N(1) through 56-N(M) of the Rx digital subsystem 48-N of the Rx chain 38-N are generally referred to herein collectively as the power meters 56-N of the Rx chain 38-N and individually as the power meter 56-N of the Rx chain 38-N. Even more generally, the power meters 56-1(1) through 56-1(M) 56-N(1) through 56-N(M) are generally referred to herein collectively as power meters 56 and individually as power meter 56. Note that while the power meters 56 are illustrated as being part of the respective Rx chains 38, the present disclosure is not limited thereto. For example, the power meters 56 may alternatively be implemented as part of the supervision subsystem 40. Also, while each Rx chain 38 receives the same number (M) of carriers in this example, the Rx chains 38 may receive different subsets of the M carriers, where, as used herein, a "subset" of carriers may be all carriers received by the radio node 34 or some set of less than all of the carriers received by the radio node 34.

Each Rx chain 38 receives one or more carriers. For example, for embodiments in which the radio node 34 is a RBS, each Rx chain 38 receives one or more cellular network carriers such as, for example, a Global System for Mobile Communications (GSM) carrier(s), a Wideband Code Division Multiple Access (WCDMA) carrier(s), a Long Term Evolution (LTE) Time Division Duplexing (TDD) carrier(s), and/or a LTE Frequency Division Duplexing (FDD) carrier(s).

The power meters 56 are implemented in hardware or a combination of hardware and software. For example, the power meters 56 may include one or more processors or processor circuits (e.g., one or more Application Specific Integrated Circuits (ASICs), one or more Field Programmable Gate Arrays (FPGAs), or the like, or any combination thereof). The power meters 56 operate to provide Received Total Wideband Power (RTWP) measurements for the received carriers for the respective Rx chains 38. As used herein, an RTWP measurement for a carrier is a measurement of total received signal power across the bandwidth of the carrier. One example is RTWP as defined for Third Generation (3G) Wideband Code Division Multiple Access (WCDMA). However, as used herein, RTWP is not limited to 3G WCDMA; rather, as used herein, RTWP is a more general term that refers to total received signal power across the bandwidth of a carrier. RTWP may alternatively be referred to as average power over settable time intervals or durations. In some embodiments, RTWP is a value of a power measurement configurable in bandwidth size, the center frequency of the configured bandwidth, time duration over which the received signal power is estimated, and the position in time for the start and stop of the measurement time duration. In some embodiments, the RTWP measurement represents the total received signal power as measured during a pre/specified interval of time. In some embodiments, the RTWP measurement is implemented by a sum of the squared complex IQ stream over the specified time interval, followed by a division of the result with the measurement time, and a scaling according to the valid power scale factor for the specific point in the Rx chain 38.

The RTWP measurements for Rx branch 1 for carriers 1 to M are referred to as $y_{k,B1,C1}^{RTWP}$ to $y_{k,B1,CM}^{RTWP}$ respectively, where k is the measurement index and k=1, 2, . . . . Likewise, the RTWP measurements for Rx branch N for carriers 1 to M are referred to as $y_{k,BN,C1}^{RTWP}$ to $y_{k,BN,C1}^{RTWP}$, respectively, where k is the measurement index and k=1, 2, . . . . As discussed below, the supervision subsystem 40 utilizes the RTWP measurements provided by the power meters 56 to detect faults in the Rx chains 38.

The supervision subsystem 40 is implemented in hardware or a combination of hardware and software, depending on the particular implementation. For example, the supervision subsystem 40 may include one or more processors or processor circuits (e.g., one or more Central Processing Units (CPUs), one or more ASICs, one or more FPGAs, or the like, or any combination thereof). Further, in some embodiments, the processor(s) execute software that provides at least some of the functionality of the supervision subsystem 40 described herein. Note that while the supervision subsystem 40 is illustrated in the example of FIG. 2 as being part of the radio node 34, the supervision subsystem 40 may alternatively be implemented in a node(s)/devices/systems that are separate or remote from the radio node 34 (e.g., virtualized "in the cloud").

Using the RTWP measurements provided by the power meters 56, the supervision subsystem 40 operates to monitor for faults in the Rx subsystem 36 of the radio node 34 and estimate the location of any detected fault(s) in the Rx subsystem 36 based on noise floor estimates for the Rx chains 38 and, in some scenarios, (e.g., long-term) average receiver power measurements for the Rx chains 38, as described below. In general, rather than being based on tone injection which has several associated drawbacks, the supervision subsystem 40 monitors for a fault in the Rx subsystem 36 of the radio node 34 based on estimating a noise floor at a specific point (e.g., at the outputs of the Rx digital subsystems 48 of the Rx chains 38 in the example of FIG. 2) of each of the multiple Rx chains 38 in the Rx subsystem 36. In some embodiments, noise floor estimation is performed during operation of the radio node 34 using a measurement configuration that increases the probability that the conditions for measuring the receiver's own thermal noise is increased. Measurement can be performed during idle intervals within "live" traffic. As used herein, "live" traffic or, in other words, data traffic.

It is suggested that, under normal conditions (i.e., correct operating conditions), the noise floor of an Rx chain 38 stays approximately equal to a predefined nominal value. In particular, the noise floor of an Rx chain 38 in the case of a gain calibrated Rx subsystem 36 stays approximately equal to a predefined nominal value under normal conditions. For each of the Rx chains 38, the supervision subsystem 40 determines whether or not the Rx chain 38 is experiencing a fault by comparing the estimated (measured) noise floor of the Rx chain 38 to a respective nominal value, or more specifically to predefined upper and lower thresholds that define a range around the nominal value. If the estimated noise floor is outside of this range, then there is a statistically meaningful difference between the estimated noise floor and the nominal value, which indicates that there is a fault in the Rx chain 38. The nominal value for the noise floor is obtained, e.g., either by calibration in production or by calculation using the nominal antenna temperature, calibrated uplink (UL) gains, and corresponding noise floors. Note that, as used herein, "detecting a fault" or "determining that there is a fault" or similar language means that the supervision subsystem 40 has actually detected a fault or has determined, based on various information, that there is a fault within some reasonable or predetermined degree of certainty (i.e., there is a statistically meaningful likelihood that there is a fault). This does not necessarily mean that there is an actual fault (e.g., there may be a false positive when determining whether there is a fault).

The supervision of blocks before the TMA 44 or before the Rx analog subsystem 50, i.e. antennas, feeder cables, filters, and duplexers is done after determining that there is no fault in the Rx chain 38 based on the noise floor estimation, by comparing measurements of the (e.g., long-term) average receive power to a mean (e.g., long-term) of the average receive power across the multiple Rx chains 38 (for the same carrier). It is suggested that under normal conditions, the Rx power at multiple antennas 42 of the same sector averaged over a substantial amount of time (hours) is the same or balanced. Note that the power balance check may also be performed in the case when the noise floor is not within the expected range.

Figure 3:
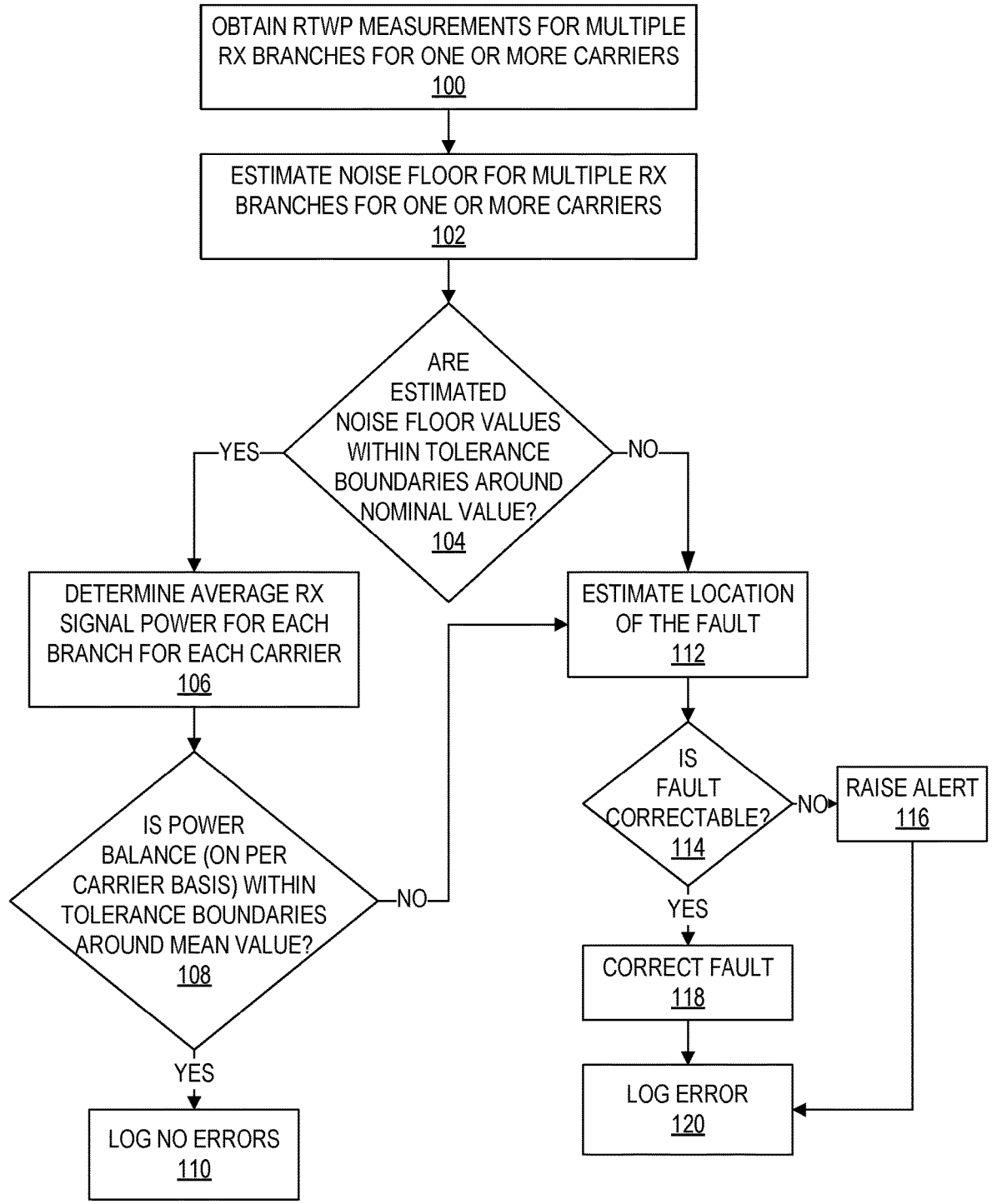
FIG. 3 is a flow chart that illustrates the operation of the supervision subsystem of FIG. 2 according to some embodiments of the present disclosure.

FIG. 3 is a flow chart that illustrates the operation of the supervision subsystem 40 of FIG. 2 according to some embodiments of the present disclosure. Note that while the flow chart illustrated in FIG. 2 illustrates a number of steps, not all of the steps may be performed in all implementations. For example, some embodiments may not include the steps relating to fixing a detected fault.

As illustrated in FIG. 3, the supervision subsystem 40 obtains RTWP measurements for each of the multiple Rx chains 38 for one or more carriers (step 100). Notably, in the example of FIG. 2, each Rx chain 38 receives multiple carriers; however, the process of FIG. 3 is equally applicable whether the Rx chains 38 receive one carrier or receive multiple carriers. The supervision subsystem 40 obtains separate RTWP measurements for each Rx chain 38 for each carrier received by that Rx chain 38. Using the RTWP measurements, the supervision subsystem 40 estimates the noise floor of each of the Rx chains 38 for each of the one or more carriers (step 102). While any suitable noise floor estimation technique may be used, in some embodiments, a soft-recursive noise floor estimation technique is used, while in other embodiments a hard sliding window noise floor estimation technique is used. Both of these techniques are described in detail below.

The supervision subsystem 40 determines whether the estimated noise floors for the Rx chains 38 are with tolerance boundaries around a predefined nominal noise floor value (step 104). Note that each Rx chain 38 will typically have a separate (e.g., different) predefined nominal noise floor value. If all of the estimated noise floor values are within the tolerance boundaries around the predefined nominal noise floor value, then, at this point, no fault has been detected. Note that while in this example the estimated noise floors for all of the Rx chains 38 for all of the carriers are considered, the present disclosure is not limited thereto. Any suitable subset of the noise floor estimates may be considered in step 104. Here, "subset" can be the entire set (i.e., all of the noise floor estimates) or less than the entire set. For example, if the supervision subsystem 40 desires to monitor only certain carriers (for example, the radio node 34 may be using less than all carriers that are supported by or could be used by the radio node 34), then the supervision subsystem 40 may consider only those noise floor estimates for the Rx chains 38 and carriers of interest.

The supervision subsystem 40 then checks a power balance in, or across, the multiple Rx branches. The power balance is checked on a per-carrier basis. More specifically, for a particular carrier, the supervision subsystem 40 determines (e.g., calculates) measurements of an (e.g., long-term) average received signal power on that carrier for each of the Rx chains 38 (step 106). Note that, as used herein, "average" is not limited to arithmetic average but can be any weighted average or any other type of average. For each carrier (i.e., on a per-carrier basis), the supervision subsystem 40 determines whether the power balance for that carrier is within predefined tolerance boundaries around a mean of the (e.g., long-term) average received signal power on the carrier across the multiple Rx chains 38 (step 108). More specifically, for each carrier, the supervision subsystem 40 determines whether the (e.g., long-term) average power on that carrier for any of the Rx chains 38 is outside of a predefined range around the mean of the (e.g., long-term) average received signal power on that carrier across the multiple Rx chains 38. If the average power values for all of the Rx chains 38 on that carrier are within the tolerance range, then there is power balance on that carrier. Otherwise, there is not. If there is power balance for all carriers (step 108, YES), then the supervision subsystem 40 records, or logs, that there are no faults (step 110). Note that while in this example the average received signal power measurements for all of the Rx chains 38 for all of the carriers are considered, the present disclosure is not limited thereto. Any suitable subset of the average received signal power measurements may be considered in step 110. Here, "subset" can be the entire set (i.e., all of the average received signal power measurements) or less that the entire set. For example, if the supervision subsystem 40 desires to monitor only certain carriers (for example, the radio node 34 may be using less than all carriers that are supported by or could be used by the radio node 34), then the supervision subsystem 40 may consider only those average received signal power measurements for the Rx chains 38 and carriers of interest.

If any of the estimated noise floor values are determined to be outside of the tolerance range in step 104 or if there is a power imbalance determined for any carrier in step 108, then the supervision subsystem 40 has detected a fault in the Rx subsystem 36. At least in some embodiments, the supervision subsystem 40 then estimates a location of the detected fault in the Rx subsystem 36 using, e.g., the noise floor estimates and/or results of the power balance check (step 112). For instance, if the fault was detected as a result of a noise floor estimate(s) being outside of the tolerance range, then the supervision subsystem 40 may estimate that the location of the fault is an active component in the Rx chain(s) 38 for which the noise floor estimate is outside of the tolerance range. In contrast, if the fault was detected as a result of a power imbalance, then the supervision subsystem 40 may estimate that the location of the fault is a passive component (e.g., a filter, cable, or connector) in the Rx chain(s) 38 for which the average received signal power was detected as being outside of the tolerance range.

In some embodiments, the supervision subsystem 40 determines whether the fault is automatically correctable (step 114). In particular, the supervision subsystem 40 determines whether the detected fault is a fault that can be corrected (or at least potentially corrected) autonomously by the supervision subsystem 40 (e.g., by re-flashing registers or the like). This determination may be based on the estimated location of the detected fault. If the supervision subsystem 40 determines that the fault is not automatically correctable (step 114; NO), then the supervision subsystem 40 raises or sends an alert, e.g., to a Network Operations Center (NOC) or a person/operator that can decide on an appropriate action to be taken (e.g., send maintenance personnel) (step 116). However, if the fault is automatically correctable (step 114; YES), the supervision subsystem 40 attempts to automatically correct the fault (step 118). The manner in which the supervision subsystem 40 attempts to automatically correct the fault will vary depending on the estimated type of fault and implementation, but, as an example, the supervision subsystem 40 may attempt to automatically correct the fault by re-flashing registers of the associated component if the component is programmable (through a set of parameters that reside in one or several configuration registers). As another example, the supervision system 40 may invoke another test procedure. As yet another example, the supervision system 40 may switch off a faulty component (e.g., filter) or antenna branch 46. Lastly, whether proceeding from step 116 or 118, the supervision subsystem 40 records or logs the detected fault (step 120).

Note that the tolerance boundaries in step 104 and step 108 are defined, e.g., using rigorous statistical tests based on tolerated probability of false alarm and measuring accuracy of the noise floor and power balance. Also note that duplex Transmitter (Tx)/Rx antennas are usually supervised by measuring Voltage Standing Wave Ratio (VSWR), i.e. the power balance check can be skipped in such a case. VSWR can produce additional information about the antenna duplexer filter and antenna system including the antenna cable, but this is not something that is typically automatically correctable and may have its own feed into the supervision subsystem 40.

Figure 4:
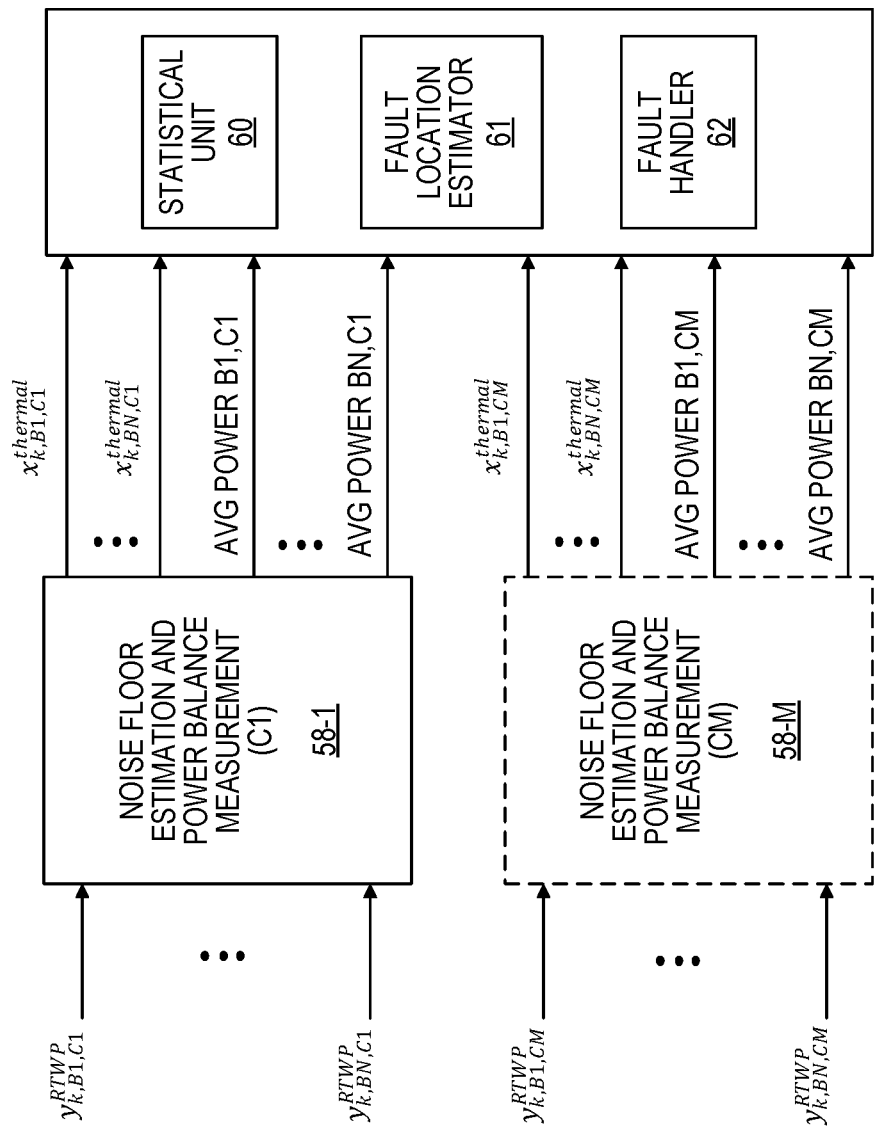
FIG. 4 illustrates the supervision subsystem of FIG. 2 in more detail according to some embodiments of the present disclosure.

FIG. 4 illustrates the supervision subsystem 40 of FIG. 2 in more detail according to some embodiments of the present disclosure. As illustrated, the supervision subsystem 40 includes a number of noise floor estimation and power balance measurement functions 58-1 through 58-M for a number (M) of carriers. Note that in some embodiments there is only one carrier in which case there is only one noise floor estimation and power balance measurement function 58 (i.e., 58-1).

Based on the RTWP measurements $y_{k,B1,C1}^{RTWP}$ to $y_{k,BN,C1}^{RTWP}$ for C1 for the Rx chains 38-1 through 38-N, respectively, the noise floor estimation and power balance measurement function 58-1 operates to generate noise floor estimates for each of the Rx chains 38-1 through 38-N for carrier 1 or C1. The noise floor estimates for the Rx chain 38-1 for carrier 1 (C1) are denoted as $y_{k,B1,C1}^{thermal}$, where k=1, 2, . . . ; the noise floor estimates for Rx chain 38-2 for C1 are denoted as $y_{k,B2,C1}^{thermal}$, where k=1, 2, . . . ; and so on. In the same manner, the other noise floor estimation and power balance measurement functions 58-2 through 58-M, if any, generate noise floor estimates for Rx chains 38 for the other carriers (referred to here as carriers 2 through M or C2 through CM).

The noise floor estimation and power balance measurement function 58-1 also generates average received signal power measurement values for C1 for each of the Rx branches 38-1 through 38-N. As discussed below, the statistical unit 60 uses this information to determine which, if any, of the Rx chains 38 has a detected power imbalance with respect to the other Rx chains 38 on C1. In the same manner, the noise floor estimation and power balance measurement function 58-M, if included, generates average received signal power measurement values for CM for each of the Rx branches 38-1 through 38-N. As discussed below, the statistical unit 60 uses this information to determine which, if any, of the Rx chains 38 has a detected power imbalance with respect to the other Rx chains 38 on CM.

The supervision subsystem 40 also includes a statistical unit 60 that processes the outputs of the noise floor estimation and power balance measurement function(s) 58 to detect a fault(s). The supervision subsystem 40 also includes a fault location estimator 61 that estimates the location of the fault(s) detected by the statistical unit 60. The supervision subsystem 40 also includes a fault handler 62 that attempts to automatically correct the detected fault(s).

Figure 5:
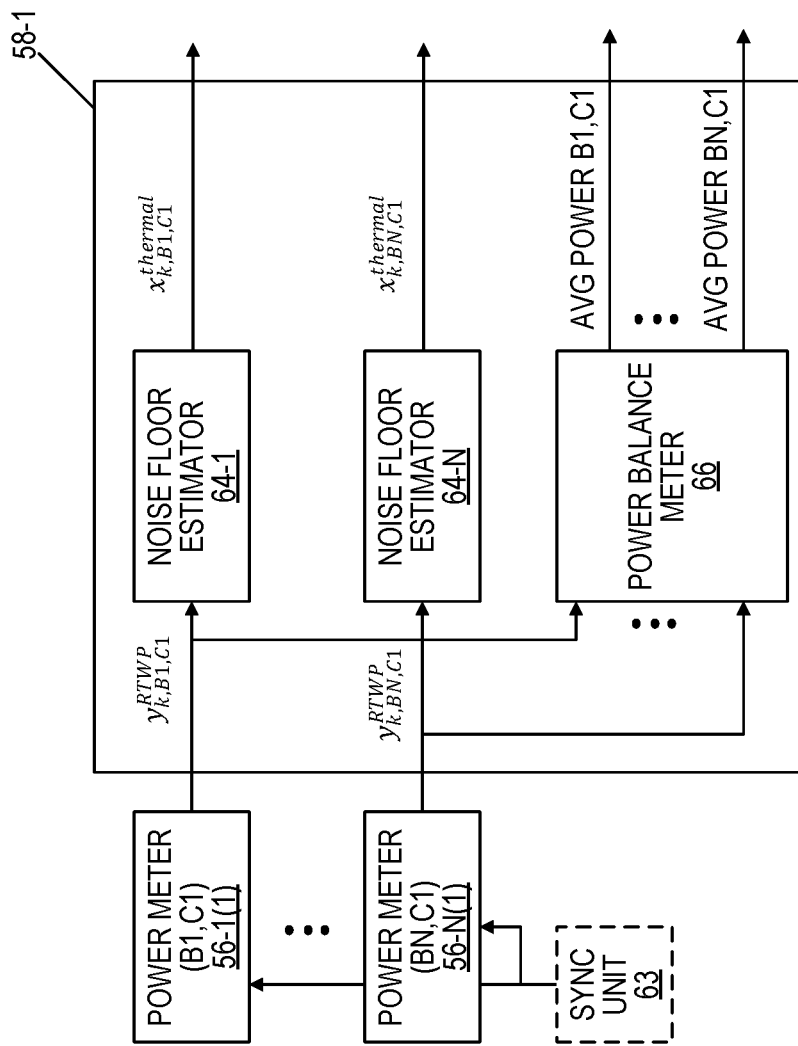
FIG. 5 is a block diagram of the noise floor and power balance measurement function of FIG. 4 according to some embodiments of the present disclosure.

FIG. 5 is a block diagram of the noise floor estimation and power balance measurement function 58-1 according to some embodiments of the present disclosure. This discussion is equally applicable to the other noise floor estimation and power balance measurement function(s) 58, if any. Before discussing the details of the noise floor estimation and power balance measurement function 58-1, a discussion of the power meters 56-1(1) through 56-N(1) for C1 for the N Rx chains 38-1 through 38-N, respectively, is beneficial. As illustrated, the power meters 56-1(1) through 56-N(1) generate RTWP measurements ($y_{k,B1,C1}^{RTWP}$ through $y_{k,BN,C1}^{RTWP}$, for k=1, 2, . . . ) for the Rx chains 38-1 through 38-N, respectively, for C1. In particular, the power meters 56-1(1) through 56-N(1) measure RTWP of the "live" (e.g., UL) traffic. In the context of a cellular communications network or similar network having a defined subframe structure, in order to maximize the probability of capturing idle gaps within the traffic for the purpose of the noise floor estimation, the start and duration of the power measurement are, in some embodiments, aligned with a carrier subframe structure of the received signals. The alignment is done by a synchronization unit 63 that is assumed to have timing information on the UL carriers, as well as on the duplex mode, i.e. FDD or TDD.

Figure 6:
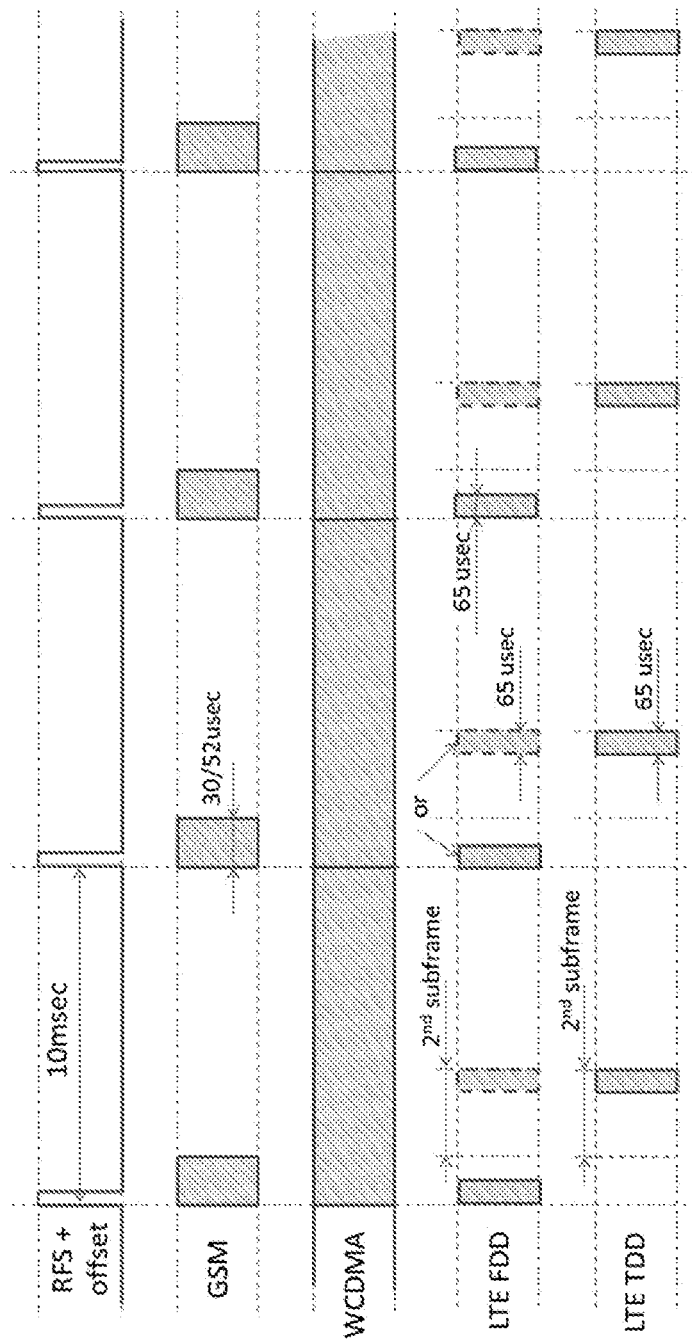
FIG. 6 illustrates Received Total Wideband Power (RTWP) measurement intervals in different Third Generation Partnership Project (3GPP) Radio Access Technologies (RATs)

RTWP measurement intervals in different 3GPP Radio Access Technologies (RATs) are shown in FIG. 6, as an example. As an example, the following rational is used:

GSM: The RTWP measurement interval is less than the burst duration. Every fourth measurement occupies a full burst that might be idle.

WCDMA: The Rx signal is below the noise floor. RTWP is measured over the entire 10 millisecond frame.

LTE FDD: The RTWP measurement interval is less than the duration of one Orthogonal Frequency Division Multiplexing (OFDM) symbol that might be idle.

LTE TDD: The RTWP measurement interval is less than the duration of one OFDM symbol that might be idle. RTWP is measured at the end of the second subframe, which is always a UL subframe.

It is presumed that the bandwidth of the measured signals is controlled by a channel filter in the respective carrier branch 54. Otherwise, the power meter bandwidth is configured depending on the RAT, as specified by corresponding Third Generation Partnership Project (3GPP) standards.

Returning to FIG. 5, the RTWP measurements ($y_{k,B1,C1}^{RTWP}$ through $y_{k,BN,C1}^{RTWP}$, for k=1, 2, ...) are utilized by noise floor estimators 64-1 through 64-N to generate noise floor estimates ($y_{k,B1,C1}^{thermal}$ through $y_{k,BN,C1}^{thermal}$ for k=1, 2, ...) for the Rx chains 38-1 through 38-N, respectively, for C1. The RTWP measurements ($y_{k,B1,C1}^{RTWP}$ through $y_{k,BN,C1}^{RTWP}$, for k=1, 2, ...) are also utilized by a power balance meter 66 to measure the (e.g., long-term) average received signal power on C1 for each of the Rx chains 38-1 through 38-N. As discussed above, the noise floor estimates ($y_{k,B1,C1}^{thermal}$ through $y_{k,BN,C1}^{thermal}$, for k=1, 2, ...) and the power information are used by the statistical unit 60 and the fault location estimator 61 to detect a fault(s) in the Rx subsystem 36 and estimate a location of the detected fault(s) in the Rx subsystem 36. For instance, as discussed herein, the statistical unit 60 compares the (e.g., long-term) average received signal power measurements for the Rx chains 38-1 through 38-N output by the power balance meter 66 to a predefined tolerance range around the mean of the (e.g., long-term) average received signal power for C1 across the Rx chains 38-1 through 38-N to identify which of the Rx chains 38-1 through 38-N, if any, has a measured (e.g., long-term) average received signal power on C1 that is outside of the predefined tolerance range.

Figure 7:
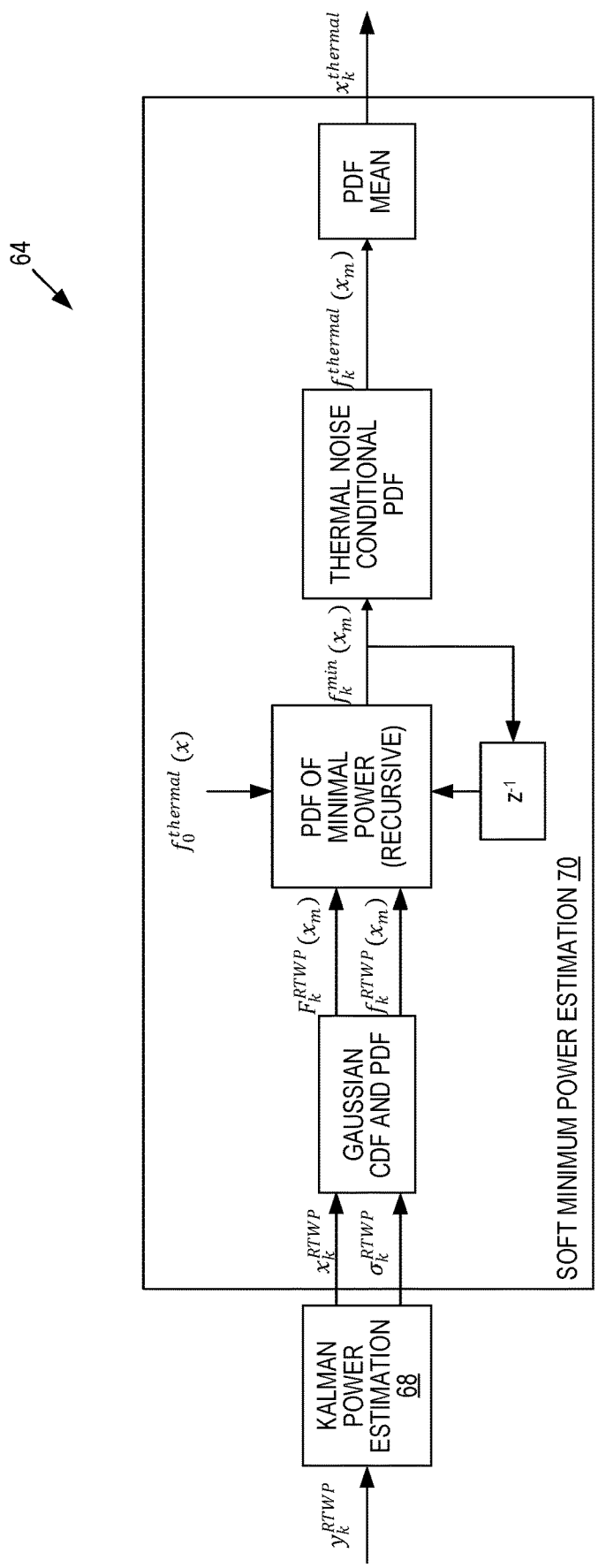
FIG. 7 illustrates an embodiment in which the noise floor estimator of FIG. 5 implements a soft recursive noise floor estimation technique.
Figure 8:
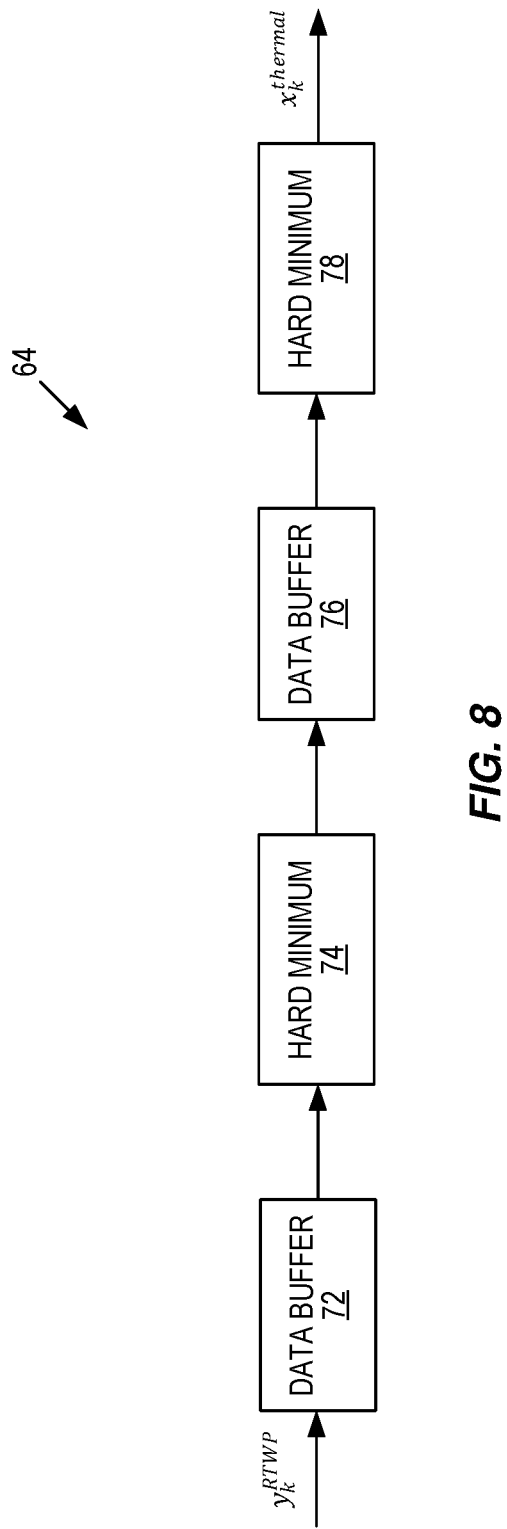
FIG. 8 illustrates an embodiment in which the noise floor estimator of FIG. 5 implements a hard sliding window noise floor estimation technique.

FIGS. 7 and 8 illustrate two example embodiments of the noise floor estimator 64 (i.e., any one of the noise floor estimators 64-1 through 64-N) according to some embodiments of the present disclosure. Note however that the examples of FIGS. 7 and 8 are non-limiting (i.e., other noise floor estimation techniques may be used).

In particular, FIG. 7 illustrates an embodiment in which the noise floor estimator 64 implements a soft recursive noise floor estimation technique. The basic idea of the soft recursive noise floor estimation technique is to build a histogram of the minimum RTWP measured for the respective Rx chain 38 on the respective carrier over a long time (hours). The noise floor is then estimated as the histogram mean. In the particular embodiment of FIG. 7, the noise floor estimator 64 includes a Kalman power estimation function 68, which may also be referred to as a Kalman filter, and a soft minimum power estimation function 70.

The Kalman power estimation function 68 is designed to suppress the embedded noise of the input RTWP measurements $y_k^{RTWP}$, for k=1, 2, .... Here, $y_k^{RTWP}$ denotes the RTWP measurements for the respective Rx chain 38 on the respective carrier. The soft minimum power estimation function 70 uses the estimated power ($x_k^{RTWP}$) and standard deviation ($\sigma_k^{RTWP}$) output from the Kalman power estimation function 68 to build a conditional histogram and estimate the minimum power ($x_k^{thermal}$), which represents the thermal noise floor.

To reduce the computational complexity and required memory space, the histogram is built recursively in the discrete logarithmic scale. The initial noise floor distribution is given by $f_0^{thermal}(x)$.

The Kalman power estimation function 68, or Kalman filter, is tuned to a specific power operating point close to the anticipated noise floor. It is expected that large variations of the actual measured power above the operating point would result in lower resolution of the power level histogram. To maintain a fixed resolution, the input power is scaled prior to the filtering, and the estimated minimum power is then compensated by the scaling factor.

The RTWP is modeled as:

$$y_k^{RTWP} = x_k^{RTWP} + e_k,$$

where $e_k$ denotes a measurement disturbance and is assumed to be white Gaussian vector with zero mean and standard deviation $\sigma_1$.

The variations of the RTWP are modeled by the random walk model:

$$x_{k+1}^{RTWP} = x_k^{RTWP} + w_k,$$

where the system noise $w_k$ is zero mean white and Gaussian with standard deviation $\sigma_2$.

From these, the following Kalman power estimation function 68 runs in two steps:

Step 1: Initialization $$x_{1|0} = x_0^{RTWP}$$

$$\sigma_{1|0} = \sigma_0^{RTWP}$$

Step 2: Iteration $$k = 1, 2, \ldots$$

$$K_k = \frac{\sigma_{k|k-1}^2}{\sigma_{k|k-1}^2 + \sigma_2^2}$$

$$x_{k|k} = x_{k|k-1} + K_k(y_k^{RTWP} - x_{k|k-1})$$

$$x_k^{RTWP} = x_{k|k}$$

$$\sigma_{k|k}^2 = \sigma_{k|k-1}^2(1 - K_k) + \sigma_2^2$$

$$\sigma_k^{RTWP} = \sqrt{\sigma_{k|k}^2 + \sigma_1^2}$$

Indices k correspond to RTWP measurements done every Transmit Time Interval (TTI). $x_{k|k-1}$ and $x_{k|k}$ denote one step prediction and estimation of RTWP with corresponding variances $\sigma_{k|k-1}^2$ and $\sigma_{k|k}^2$, respectively, and $K_k$ is the Kalman filter gain.

The estimation of the thermal noise floor is performed on an increasing logarithmic power grid of $x_m$, m=1, ..., M+1 points.

The conditional histogram of the minimum power is calculated iteratively as:

Step 1: Initialization $$f_1^{min}(x_m) = f_0^{thermal}(x_m)$$

Step 2: Iteration $$f_k^{min}(x_m) = \alpha_1(1 - F_k^{RTWP}(x_m)) \cdot f_{k-1}^{min}(x_m) + (1 - \alpha_1) f_k^{RTWP}(x_m) \cdot \Gamma_{k-1}(x_m),$$

where $$f_k^{RTWP}(x_m) = \text{GaussPDF}(x_m); \text{mean} = x_k^{RTWP}, \text{std} = \sigma_k^{RTWP}$$

$$F_k^{RTWP}(x_m) = \text{GaussCDF}(x_m); \text{mean} = x_k^{RTWP}, \text{std} = \sigma_k^{RTWP}$$

are Gaussian Probability Density Function (PDF) and Cumulative Distribution Function (CDF), respectively, and $$\Gamma_k(x_m) = \{1 - F_k^{RTWP}(x_m)\}^{1-\alpha_2} \{\Gamma_{k-1}(x_m)\}^{\alpha_2}$$

and $\alpha_1$, $\alpha_2$ are time constants.

Noise floor estimation is then calculated as:

$$f_k^{thermal}(x_m) = \frac{1}{c_k^{min}} f_k^{min}(x_m) \cdot f_0^{thermal}(x_m) \text{ where}$$

$$c_k^{min} = \sum_{m=1}^{M} f_k^{min}(x_m)(x_{m+1} - x_m)$$

is a normalization constant, and the noise floor estimate is:

$$NoiseFloor = x_k^{thermal} = \sum_{m=1}^{M} x_{m+1} \cdot f_k^{thermal}(x_m)(x_{m+1} - x_m).$$

FIG. 8 illustrates an embodiment in which the noise floor estimator 64 implements a hard sliding window noise floor estimation technique. The basic idea is to find the minimum of the input RTWP measurements $y_k^{RTWP}$, for k=1, 2, ... calculated over a long period of time (hours). The minimum represents the noise floor estimate $x_k^{thermal}$. Here, $y_k^{RTWP}$ denotes the RTWP measurements for the respective Rx chain 38 on the respective carrier. Likewise, $x_k^{thermal}$ denotes the noise floor estimate for the respective Rx chain 38 on the respective carrier. As illustrated, in this example, the noise floor estimator 64 includes two data buffers 72 and 76 as well as two hard minimum functions 74 and 78. The two data buffers 72 and 76 are used to reduce the memory size, as described below. Note that while two data buffers 72 and 76 are used for this example, the noise floor estimator 64 may include two or more data buffers, depending on the particular implementation.

The hard sliding window noise floor estimation technique is based on the following principle. Let $V = y_m^{RTWP}$, m=1, 2, ..., n be a vector of n power samples stored in n TTIs, and a window size is w. Let R be a vector containing the minimum seen in the window as it slides over the vector V, i.e. $R_i = \min\{V_j\}$, j=i+1, i+w-1. For example:

w=3,
V={4,3,2,1,5,7,6,8,9, ... }
R={2,1,1,1,5,6,6, ... }.

The simplest method to locate the minimum in the window is as follows. When the window moves one sample at a time, there are three possible actions:
 a. When the current minimum comes out of the observation window, the new minimum is calculated by re-scanning the current observation window.
 b. When the newly added value to the sliding window is less than the current minimum, the new value is set as the current minimum.
 c. Otherwise do nothing.

This method requires memory space that is proportional to w, which may become an impractical requirement when w is large. Tracking the minimum in two steps using the two data buffers 72 and 76 usually solves the problem.

Thus, the embodiment of the noise floor estimator 64 illustrated in FIG. 8 operates to perform the following modified procedure.

Step 1: For k=m×n, the hard minimum function 74 calculates the minima over m intervals of n samples each, which are stored in the data buffer 72. The hard minimum function 74 stores the minima in the data buffer 76 as vector A.

Step 2: The hard minimum function 78 locates the minimum in vector A (i.e., the minimum in the data buffer 76) following steps a, b, and c above. This minimum is the estimate of the noise floor $x_k^{thermal}$. Note N.B.: if m=1, then A=V.

Clearly, the minimum found in both straightforward and modified methods is the same, but the memory space required to store two vectors of the total length m+n is much smaller than the window size w.

Figure 9:
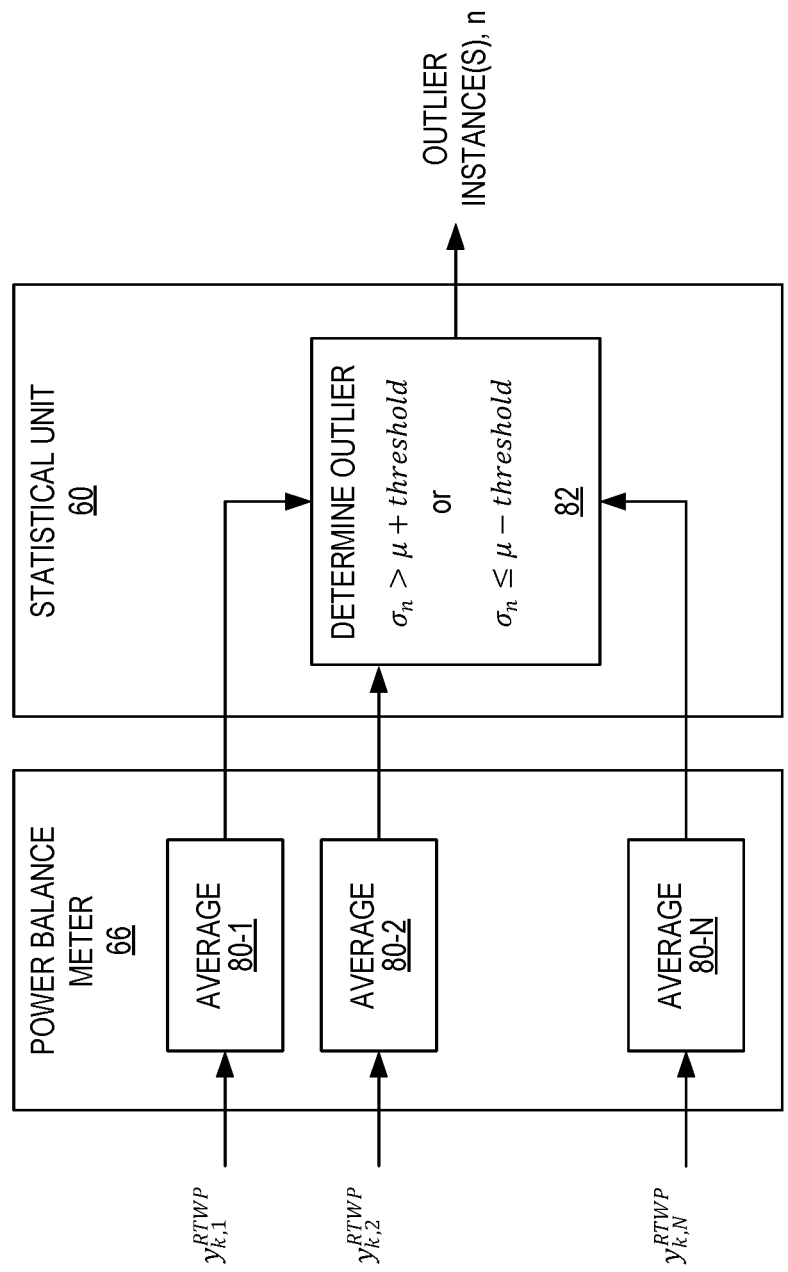
FIG. 9 illustrates the power balance meter of FIG. 5 in more detail according to some embodiments of the present disclosure.

FIG. 9 illustrates the power balance meter 66 of FIG. 5 and the statistical unit 60 of FIG. 4 in more detail according to some embodiments of the present disclosure. The power balance meter 66 includes average functions 80-1 through 80-N that calculate averages $P_n$ (e.g., long term averages, e.g., in terms of hours) of the input RTWP measurements $y_{k,n}^{RTWP}$, k=1, 2, ... and n=1, ..., N of the same carrier received by the Rx chains 38-1 through 38-N, respectively. In the statistical unit 60, a determine outlier function 82 calculates the mean $$\mu = \frac{1}{N}\sum_{n=1}^{N} P_n$$

average received signal power on the carrier across the Rx chains 38-1 through 38-N and signed deviation $\sigma_n = \mu - P_n$ for each Rx chain 38-1 through 38-N. In some embodiments, the determine outlier function 82 identifies which, if any, of the Rx chains 38-1 through 38-N have average received signal power measurements $P_n$ that are outside of a pre-defined tolerance range. In particular, in some embodiments, the determine outlier function 82 identifies which, if any, of the Rx chains 38-1 through 38-N have signed deviations $\sigma_n$ that are outside the range of $\mu$-threshold to $\mu$+threshold, where "threshold" is a predetermined value. In this manner, the Rx chains 38 that have power measurements $P_n$ that significantly deviate (in the statistical sense) from the mean $\mu$ are identified. In some embodiments, the determination of which, if any, of the Rx chains 38-1 through 38-N are outliers (according to either of the schemes described above) may be made by the statistical unit 60 based on the average $\mu$ value and the power measurements $P_n$ or the signed deviation values $\sigma_n$, which are provided from the power balance meter 66 to the statistical unit 60.

As discussed above, the fault location estimator 61 of the supervision subsystem 40 operates to estimate the location of a detected fault in the Rx subsystem 36 and the fault handler 62 operates to potentially fix the detected fault and, in some embodiments, report the detected fault based on the noise floor measurements and power balance of all configured carriers in all Rx chains 38. Embodiments of the present disclosure presume using any rigorous statistical test that allows:
 In the case of the noise floor estimation, finding a deviation threshold above which the measured noise floor is considered significantly different from the nominal value obtained during radio calibration.
 In the case of power balance measurement, finding a deviation threshold above which the power measured in branch n is considered significantly different from the average calculated over all Rx chains 38.

In both cases, in some embodiments, the thresholds are calculated based on tolerated probability of false alarm and measuring accuracy of the noise floor estimator or the power balance meter. However, the thresholds may be determined using any suitable technique.

Figure 10:
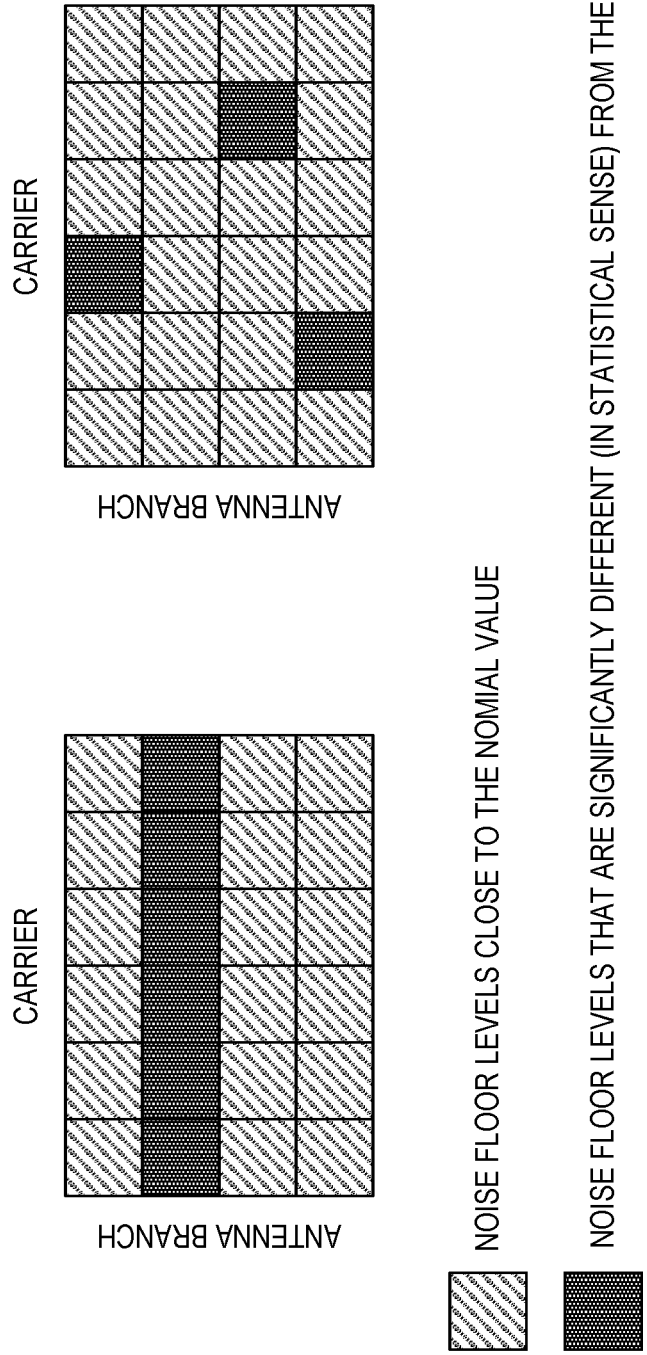
FIGS. 10 and 11 show examples of particular cases of faults for which the location of the fault can be estimated and the fault can be fixed autonomously at the radio node or fixed remotely via a remote system or operator (e.g., at a Network Operations Center (NOC)) according to some embodiments of the present disclosure.
Figure 11:
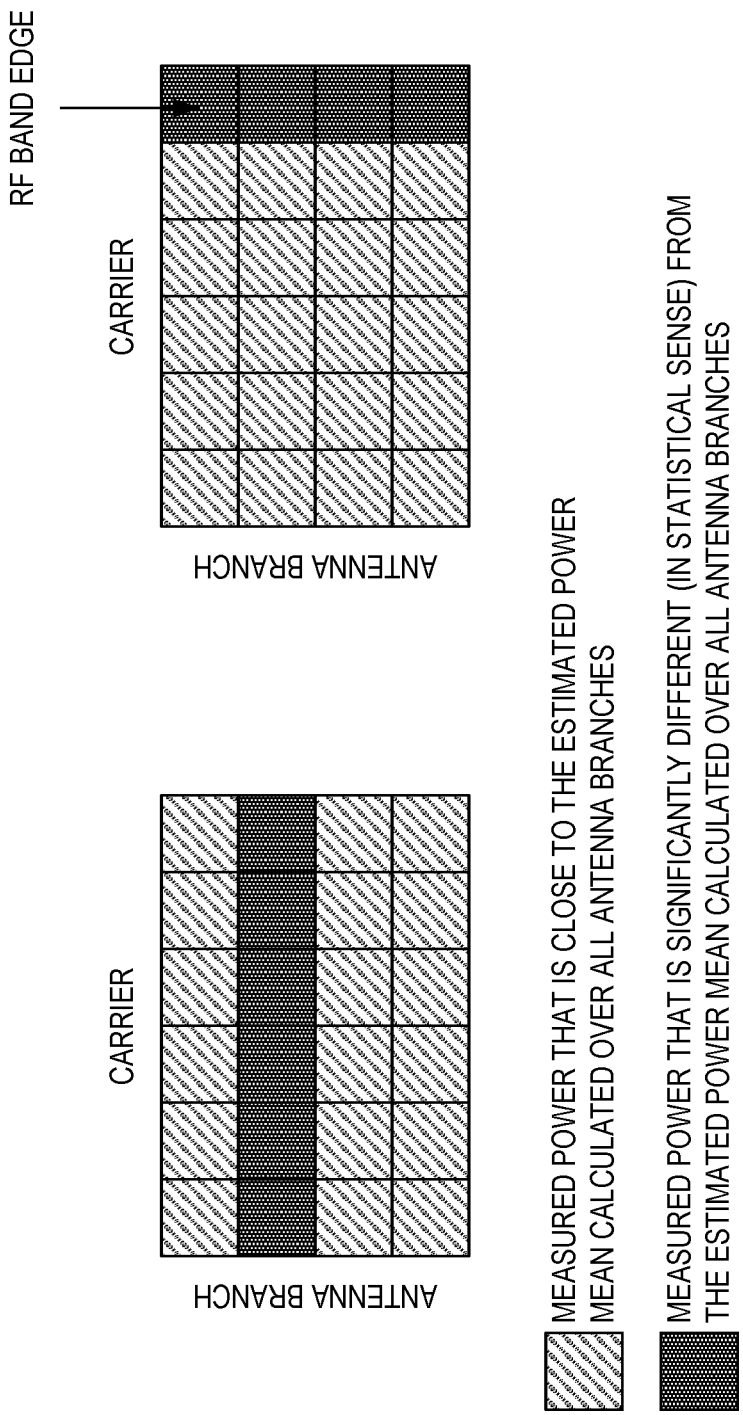

FIGS. 10 and 11 show examples of particular cases of faults for which the location of the fault can be estimated and the fault can be fixed autonomously at the radio node 34 or fixed remotely via a remote system or operator (e.g., at a NOC).

In particular, FIG. 10 illustrates an example in which there are four Rx chains 38 and thus four antenna branches 46 and six carriers. The results of the fault monitoring are presented in a matrix form: antenna branch vs. carrier. The left side of FIG. 10 illustrates an example in which faults were detected due to the noise floor estimates for all carriers for one of the antenna branches 46. In this example, the detected fault is likely a fault in the Rx analog subsystem 50 of that antenna branch 46 and/or in the respective carrier branch 54 of the corresponding Rx digital subsystem 48. As such, the fault can be corrected (or attempted to be corrected) by re-flashing associated registers. The right side of FIG. 10 illustrates an example in which the noise floor estimates for a mixture of antenna branches 46 and carriers fall outside the predefined tolerance range. In this example, the detected faults are likely in ASIC filter branches (i.e., individual filter branches associated with the digital signal processing of a particular carrier), and the faults are corrected by (or attempted to be corrected by) re-flashing associated registers.

FIG. 11 illustrates an example in which there are four Rx chains 38 and thus four antenna branches 46 and six carriers. The results of the fault monitoring are presented in a matrix form: antenna branch vs. carrier. The left side of FIG. 11 illustrates an example in which faults were detected due to the long-term received signal power measurements for all carriers for one of the antenna branches 46. In this example, these faults are likely a fault in antenna, feeder, or duplexer. These faults are corrected (or attempted to be corrected) in this example by disconnecting the antenna branch 46, if possible. The right-side of FIG. 11 illustrates an example in which faults were detected due to the long-term received signal power measurements for one of the carriers for all of the Rx chains 38. In this example, these faults are likely due to a fault in front-end filters and may be corrected by, e.g., switching off that antenna branch 46.

Figure 12:
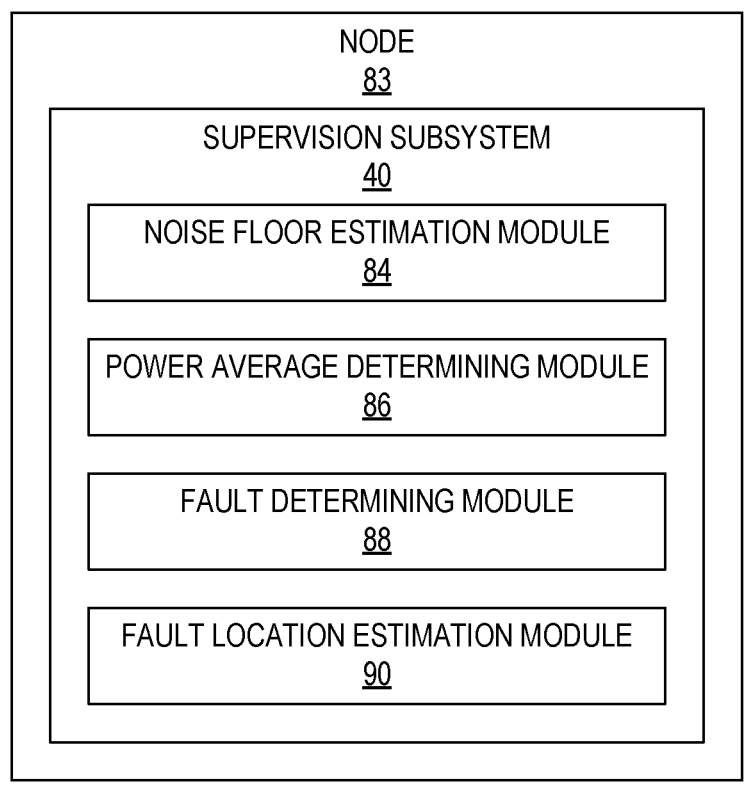
FIG. 12 illustrates the radio node according to some other embodiments of the present disclosure.

FIG. 12 illustrates a node 83 (e.g., the radio node 34) according to some other embodiments of the present disclosure in which the supervision subsystem 40 is implemented as number of modules, each of which is implemented in software. Notably, in some embodiments, the supervision subsystem 40 is implemented in the radio node 34; in other embodiments, the supervision subsystem 40 is implemented in some other node which may be remote from the radio node 34. As illustrated, in this example, the supervision subsystem 40 includes a noise floor estimation module 84, a power average determining module 86, a fault determining module 88, and a fault location estimation module 90. The supervision subsystem 40 may include additional modules that operate additional functionality of the supervision subsystem 40. The estimation module 84 operates to estimate a noise floor for each Rx chain 38 in the Rx subsystem 36 of the radio node 34 for each of one or more carriers, as described above. The determining module 86 operates to determine (e.g., long-term) average received signal power for each Rx chain 38 for each of one or more carriers, as described above. The determining module 88 operates to determine that there is a fault in the Rx subsystem 36 of the radio node 34 based on at least one of (a) a subset of the noise floor estimates and (b) a subset of the (e.g., long-term) average received signal power measurements, as described above. Note that as used herein, a "subset" of the noise floor estimates may include all of the noise floor estimates or some set of less than all of the noise floor estimates. Likewise, the "subset" of the average received signal power measurements may include all such measurements or some set of less than all of such measurements. The estimation module 90 operates to, upon detection of a fault in the Rx subsystem 36 by the determining module 88, estimate a location of the fault in the Rx subsystem 36 of the radio node 34, as described above.

In some embodiments, a computer program including instructions which, when executed by at least one processor, causes the at least one processor to carry out the functionality of the radio node 34 or the supervision subsystem 40 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as memory).

While not being limited to or by any particular advantage or benefit, some examples of advantages and benefits of embodiments of the present disclosure are as follows. Embodiments of the present disclosure can be used with any digital receiver system during its normal operation using "live" UL/received data traffic. Detected faults can be classified, and only those that are serious enough to require a site visit will result in such a visit. Since site visits are costly, the operational expenses are likely to be reduced. Some additional advantages include, for example, enhanced observability of the Rx chains 38, reduced operator expenses during field operation, and availability of logged data for trending and statistical analysis of radio operation in the case of return.

The following acronyms are used throughout this disclosure.
- 3G Third Generation
- 3GPP Third Generation Partnership Project
- ADC Analog-to-Digital Converter
- AP Antenna Port
- ASIC Application Specific Integrated Circuit
- CDF Cumulative Distribution Function
- CPU Central Processing Unit
- DU Digital Unit
- FDD Frequency Division Duplexing
- FPGA Field Programmable Gate Array
- GSM Global System for Mobile Communications
- LNA Low Noise Amplifier
- LTE Long Term Evolution
- NOC Network Operations Center
- OFDM Orthogonal Frequency Division Multiplexing
- RAT Radio Access Technology
- RBS Radio Base Station
- RTWP Received Total Wideband Power
- Rx Receiver
- TDD Time Division Duplexing
- TMA Tower Mounted Amplifier
- TTI Transmit Time Interval
- Tx Transmitter
- UL Uplink
- VSWR Voltage Standing Wave Ratio
- WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a node to monitor for faults in a receiver subsystem of a node, comprising:
   estimating a noise floor for each receiver chain of a plurality of receiver chains in the receiver subsystem of the node for each of one or more carrier branches to thereby provide a plurality of noise floor estimates;
   determining average received signal power for each receiver chain of the plurality of receiver chains in the receiver subsystem of the node for each of one or more carrier branches to thereby provide a plurality of average received signal power measurements;
   determining that there is a fault in the receiver subsystem of the node based on at least one of (a) a subset of the plurality of noise floor estimates and (b) a subset of the plurality of average received signal power measurements;
   determining whether the fault is automatically correctable;
   automatically correcting the fault upon determining that the fault is automatically correctable; and
   raising an alert upon determining that the fault is not automatically correctable.

2. The method of claim 1, further comprising, upon determining that there is a fault in the receiver subsystem of the node, estimating a location of the fault in the receiver subsystem of the node.

3. The method of claim 1, wherein determining that there is a fault in the receiver subsystem of the node comprises determining that there is a fault in the receiver subsystem of the node if at least one of a plurality of fault criteria is met, wherein the plurality of fault criteria comprises: (a) a criterion that at least one of the noise floor estimates in the subset of the plurality of noise floor estimates is outside of a predefined range around a predefined nominal value; and (b) a criterion that at least one of the average received signal power measurements in the subset of the plurality of average received signal power measurements is outside of a predefined range around a mean of an average received signal power for a respective one of the one or more carrier branches across the plurality of receiver chains.

4. The method of claim 1, further comprising estimating a location of the fault in the receiver subsystem of the node based on at least one of the plurality of noise floor estimates.

5. The method of claim 1, wherein determining that there is a fault in the receiver subsystem of the node comprises:
   determining that each of the plurality of noise floor estimates is within a predefined range around a predefined nominal value; and
   upon determining that each of the plurality of noise floor estimates is within a predefined range around a predefined nominal value, determining that there is a fault in the receiver subsystem of the node if, for any carrier branch of the one or more carrier branches, at least one of the plurality of average received signal power measurements for the plurality of receiver chains for the carrier branch is outside of a predefined range around a mean of an average received signal power for the carrier branch across the plurality of receiver chains.

6. The method of claim 1, further comprising:
   obtaining Received Total Wideband Power, RTWP, measurements for the plurality of receiver chains for the one or more carrier branches;
   wherein:
   estimating the noise floor for each receiver chain of the plurality of receiver chains in the receiver subsystem of the node for each of one or more carrier branches comprises estimating the noise floor for each receiver chain of the plurality of receiver chains in the receiver subsystem of the node for each of one or more carrier branches based on the RTWP measurements; and
   determining the average received signal power for each receiver chain of the plurality of receiver chains in the receiver subsystem of the node for each of the one or more carrier branches comprises determining the average received signal power for each receiver chain of the plurality of receiver chains in the receiver subsystem of the node for each of the one or more carrier branches based on the RTWP measurements.

7. The method of claim 6, wherein obtaining the RTWP measurements comprises obtaining the RTWP measurements during idle gaps within the live traffic for the purpose of the noise floor estimation, for which idle gaps start and duration of the power measurement are aligned with a carrier subframe structure of received signals.

8. The method of claim 6, wherein obtaining the RTWP measurements comprises obtaining the RTWP measurements in a manner in which timing utilized for obtaining the RTWP measurements is synchronized to timing of the one or more carrier branches such that the RTWP measurements are obtained within time periods that avoid the presence of overhead channel power.

9. The method of claim 6, wherein estimating the noise floor for each receiver chain of the plurality of receiver chains in the receiver subsystem of the node for each of one or more carrier branches based on the RTWP measurements comprises, for each receiver chain of the plurality of receiver chains and each carrier branch of the one or more carrier branches:
   building a histogram of a minimum RTWP measurement for the receiver chain for the carrier branch over a predefined amount of time; and
   providing a mean of the histogram as the noise floor estimate for the receiver chain for the carrier branch.

10. The method of claim 6, wherein estimating the noise floor for each receiver chain of the plurality of receiver chains in the receiver subsystem of the node for each of one or more carrier branches based on the RTWP measurements comprises, for each receiver chain of the plurality of receiver chains and each carrier branch of the one or more carrier branches:
    estimating the noise floor for the receiver chain using a hard sliding window noise floor estimation technique in which a minimum RTWP measurement is obtained from $m_1 \times m_2 \ldots \times m_N$ RTWP measurements using N buffers of sizes $m_1, m_2, \ldots, m_N$, respectively.

11. The method of claim 6, wherein estimating the noise floor for each receiver chain of the plurality of receiver chains in the receiver subsystem of the node for each of one or more carrier branches based on the RTWP measurements comprises, for each receiver chain of the plurality of receiver chains and each carrier branch of the one or more carrier branches:
    storing n RTWP measurements for the receiver chain for the carrier branch in a first buffer of size n, where n is greater than 1;

determining a minimum RTWP measurement from among the n RTWP measurements for the receiver chain for the carrier branch stored in the first buffer;

storing the minimum RTWP measurement in a second buffer of size m, where m is greater than or equal to 2;

repeating, up to m−1 times, the steps of storing n RTWP measurements for the receiver chain for the carrier branch in the first buffer of size n, determining the minimum RTWP measurement from among the n RTWP measurements for the receiver chain for the carrier branch stored in the first buffer, and storing the minimum RTWP measurement in the second buffer of size m; and providing the minimum RTWP measurement in the second buffer as the noise floor estimate for the receiver chain for the carrier branch.

12. The method of claim 1, wherein the node is a radio access node in a cellular communications network.

13. The method of claim 1, wherein determining that there is a fault in the receiver subsystem of the node comprises determining that there is a fault in the receiver subsystem of the node if at least one of the plurality of noise floor estimates is outside of a predefined range around a predefined nominal value.

14. A node, comprising:
a supervision subsystem that monitors for faults in a receiver subsystem of a radio node, wherein the receiver subsystem comprises a plurality of receiver chains, wherein the supervision subsystem comprises:
memory storing instructions; and
a processor configured to execute the instructions to cause the supervision subsystem to:
estimate a noise floor for each receiver chain of the plurality of receiver chains in the receiver subsystem of the node for each of one or more carrier branches to thereby provide a plurality of noise floor estimates;
determine average received signal power for each receiver chain of the plurality of receiver chains in the receiver subsystem of the node for each of one or more carrier branches to thereby provide a plurality of average received signal power measurements;
determine that there is a fault in the receiver subsystem of the node based on at least one of a subset of the plurality of noise floor estimates and a subset of the plurality of average received signal power measurements;
determine whether the fault is automatically correctable;
automatically correct the fault upon determining that the fault is automatically correctable; and
raise an alert upon determining that the fault is not automatically correctable.

15. The node of claim 14, wherein the processor is further operable to, upon determining that there is a fault in the receiver subsystem of the node, estimate a location of the fault in the receiver subsystem of the node.

16. The node of claim 14, wherein:
for each carrier branch of the one or more carrier branches, the node is configured to obtain Received Total Wideband Power, RTWP, measurements for the carrier branch for the plurality of receiver chains, respectively; and
wherein the supervision subsystem comprises:
for each carrier branch of the one or more carrier branches, the processor configured to execute the instructions to cause:

a plurality of noise floor estimators to output noise floor estimates for the plurality of receiver chains for the carrier branch based on the respective RTWP measurements;
a power balance meter to output, based on the RTWP measurements, an indication of which, if any, of the plurality of receiver chains have an average received signal power that is outside of a predefined range around a mean of an average received signal power across the plurality of receiver chains for the carrier branch;
a statistical unit to determine that there is a fault in the receiver subsystem of the node based on the at least one of the outputs of the plurality of noise floor estimators for the one or more carrier branches and the outputs of the power balance meters fee for the one or more carrier branches; and
a fault location estimator to estimate the location of the fault in the receiver subsystem of the node.

17. The node of claim 14 wherein, in order to determine that there is a fault in the receiver subsystem of the node, the processor is further operable to determine that there is a fault in the receiver subsystem of the node if at least one of a plurality of fault criteria is met, wherein the plurality of fault criteria comprises: (a) a criterion that at least one of the noise floor estimates in the subset of the plurality of noise floor estimates is outside of a predefined range around a predefined nominal value and (b) a criterion that at least one of average received signal power measurements in the subset of the plurality of average received signal power measurements is outside of a predefined range around a mean of an average received signal power for a respective one of the one or more carrier branches across the plurality of receiver chains.

18. The node of claim 14, wherein the processor is further operable to estimate a location of the fault in the receiver subsystem of the node based on at least one of the plurality of noise floor estimates.

19. The node of claim 14 wherein, in order to determine that there is a fault in the receiver subsystem of the node, the processor is further operable to:
determine that each of the plurality of noise floor estimates is within a predefined range around a predefined nominal value; and
upon determining that each of the plurality of noise floor estimates is within a predefined range around a predefined nominal value, determine that there is a fault in the receiver subsystem of the node if, for any carrier branch of the one or more carrier branches, at least one of the plurality of average received signal power measurements for the plurality of receiver chains for the carrier branch is outside of a predefined range around a mean of an average received signal power for the carrier branch across the plurality of receiver chains.

20. The node of claim 14, wherein the processor is further operable to:
obtain Received Total Wideband Power, RTWP, measurements for the plurality of receiver chains for the one or more carrier branches;
wherein:
in order to estimate the noise floor for each receiver chain of the plurality of receiver chains in the receiver subsystem of the node for each of one or more carrier branches, the processor is further operable to estimate the noise floor for each receiver chain of the plurality of receiver chains in the receiver subsystem of the node for each of one or more carrier branches based on the RTWP measurements; and in order to determine the average received signal power for each receiver chain of the plurality of receiver chains in the receiver subsystem of the node for each of the one or more carrier branches, the processor is further operable to determine the average received signal power for each receiver chain of the plurality of receiver chains in the receiver subsystem of the node for each of the one or more carrier branches based on the RTWP measurements.

21. The node of claim 20, wherein the RTWP measurements are obtained during idle gaps within the live traffic for the purpose of the noise floor estimation, for which idle gaps start and duration of the power measurement are aligned with a carrier subframe structure of received signals.

22. The node of claim 20, wherein the RTWP measurements are obtained in a manner in which timing utilized for obtaining the RTWP measurements is synchronized to timing of the one or more carrier branches such that the RTWP measurements are obtained within time periods that avoid the presence of overhead channel power.

23. The node of claim 20 wherein, in order to estimate the noise floor for each receiver chain of the plurality of receiver chains in the receiver subsystem of the node for each of one or more carrier branches based on the RTWP measurements, the processor is further operable to, for each receiver chain of the plurality of receiver chains and each carrier branch of the one or more carrier branches:

build a histogram of a minimum RTWP measurements for the receiver chain for the carrier branch over a predefined amount of time; and provide a mean of the histogram as the noise floor estimate for the receiver chain for the carrier branch.

24. The node of claim 20 wherein, in order to estimate the noise floor for each receiver chain of the plurality of receiver chains in the receiver subsystem of the node for each of one or more carrier branches based on the RTWP measurements, the supervision subsystem is further configured to, for each receiver chain of the plurality of receiver chains and each carrier branch of the one or more carrier branches:

estimate the noise floor for the receiver chain using a hard sliding window noise floor estimation technique in which a minimum RTWP measurement is obtained from $m_1 \times m_2 \ldots \times m_N$ RTWP measurements using N buffers of sizes $m_1, m_2, \ldots, m_N$, respectively.

25. The node of claim 20 wherein, in order to estimate the noise floor for each receiver chain of the plurality of receiver chains in the receiver subsystem of the node for each of one or more carrier branches based on the RTWP measurements, the processor is further operable to, for each receiver chain of the plurality of receiver chains and each carrier branch of the one or more carrier branches:

store n RTWP measurements for the receiver chain for the carrier branch in a first buffer of size n, where n is greater than 1;

determine the minimum RTWP measurement from among the n RTWP measurements for the receiver chain for the carrier branch stored in the first buffer;

store the minimum RTWP measurement in a second buffer of size m, where m is greater than or equal to 2;

repeat, up to m−1 times, the steps of storing n RTWP measurements for the receiver chain for the carrier branch in the first buffer of size n, determining the minimum RTWP measurement from among the n RTWP measurements for the receiver chain for the carrier branch stored in the first buffer, and storing the minimum RTWP measurement in the second buffer of size m; and provide the minimum RTWP measurement in the second buffer as the noise floor estimate for the receiver chain for the carrier branch.

26. The node of claim 14, wherein the node is a radio access node in a cellular communications network.

27. The node of claim 14, wherein, in order to determine that there is a fault in the receiver subsystem of the node, the processor is further operable to determine that there is a fault in the receiver subsystem of the node if at least one of the plurality of noise floor estimates is outside of a predefined range around a predefined nominal value.

\* \* \* \* \*

UNITED STATES PATENT AND TRADEMARK OFFICE
CERTIFICATE OF CORRECTION

PATENT NO. : 11,374,662 B2
APPLICATION NO. : 16/096798
DATED : June 28, 2022
INVENTOR(S) : Parvan et al.

It is certified that error appears in the above-identified patent and that said Letters Patent is hereby corrected as shown below:

On the Title Page

On Page 2, in Item (56), under "OTHER PUBLICATIONS", in Column 2, Line 7, delete "Torbjöorn," and insert -- Torbjörn, --, therefor.

On Page 2, in Item (56), under "OTHER PUBLICATIONS", in Column 2, Line 7, delete "Wcdma,"" and insert -- WCDMA," --, therefor.

In the Specification

In Column 9, Line 49, delete "56-1(M) 56-N" and insert -- 56-1(M)-56-N --, therefor.

In Column 10, Line 36, delete "$y_{k,B1,CM}^{RTWP}$" and insert -- $y_{k,B1,CM}^{RTWP}$, --, therefor.

In Column 10, Line 40, delete "$y_{k,BN,C1}^{RTWP}$," and insert -- $y_{k,BN,CM}^{RTWP}$, --, therefor.

In Column 14, Line 11, delete "$y_{k,B1,C1}^{thermal}$," and insert -- $x_{k,B1,C1}^{thermal}$, --, therefor.

In Column 14, Line 13, delete "$y_{k,B2,C1}^{thermal}$," and insert -- $x_{k,B2,C1}^{thermal}$, --, therefor.

In Column 15, Line 20, delete "($y_{k,B1,C1}^{thermal}$ through for" and insert -- ($x_{k,B1,C1}^{thermal}$ through $x_{k,BN,C1}^{thermal}$, for --, therefor.

In Column 15, Line 26, delete "($y_{k,B1,C1}^{thermal}$ through $y_{k,BN,C1}^{thermal}$," and insert -- ($x_{k,B1,C1}^{thermal}$ through $x_{k,BN,C1}^{thermal}$, --, therefor.

In Column 17, Line 47, delete "j=i+1, i+w-1." and insert -- j=i, i+1, . . . , i+w-1. --, therefor.

In Column 17, Line 49, delete "V={4,3,2,1,5,7,6,8,9, . . . }" and insert -- V={4,3,2,1,5,7,6,8,9, . . . }, --, therefor.

Signed and Sealed this
Seventh Day of March, 2023

Katherine Kelly Vidal
*Director of the United States Patent and Trademark Office*

In Column 20, Line 56, below "OFDM Orthogonal Frequency Division Multiplexing" insert -- PDF Probability Density Function --, therefor.